(12) United States Patent
Milstein et al.

(10) Patent No.: US 8,228,824 B2
(45) Date of Patent: Jul. 24, 2012

(54) VOIP CONTEXTUAL INFORMATION PROCESSING

(75) Inventors: David Milstein, Redmond, WA (US); David Howell, Seattle, WA (US); Kuansan Wang, Bellevue, WA (US); Linda Criddle, Kirkland, WA (US); Michael D Malueg, Renton, WA (US); Philip Andrew Chou, Bellevue, WA (US); Scott Forbes, Redmond, WA (US); Timothy M Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1267 days.

(21) Appl. No.: 11/398,817

(22) Filed: Apr. 6, 2006

(65) Prior Publication Data

US 2007/0239428 A1    Oct. 11, 2007

(51) Int. Cl.
*H04Q 11/00*    (2006.01)
(52) U.S. Cl. .................. 370/259; 370/352; 370/395.2
(58) Field of Classification Search .................. 370/352, 370/373, 377; 379/265.09, 52
See application file for complete search history.

(56) References Cited

U.S. PATENT DOCUMENTS

| | | | |
|---|---|---|---|
| 6,072,867 A | 6/2000 | Lieuwen | 379/220.01 |
| 6,151,390 A | 11/2000 | Volftsun et al. | 379/229 |
| 6,233,332 B1 | 5/2001 | Anderson et al. | 379/265.09 |
| 6,310,944 B1 * | 10/2001 | Brisebois et al. | 379/142.01 |
| 6,343,117 B1 | 1/2002 | Bhagavath et al. | 379/93.02 |
| 6,625,258 B1 | 9/2003 | Ram et al. | |
| 6,856,676 B1 | 2/2005 | Pirot et al. | 379/201.01 |
| 7,088,810 B1 | 8/2006 | Burg | 379/201.02 |
| 7,162,237 B1 | 1/2007 | Silver et al. | 455/432.3 |
| 7,284,046 B1 | 10/2007 | Kreiner et al. | 709/223 |
| 7,330,542 B2 * | 2/2008 | Kauhanen et al. | 379/229 |
| 7,359,496 B2 * | 4/2008 | Qian et al. | 379/201.07 |
| 7,502,364 B2 | 3/2009 | Milstein et al. | 370/356 |
| 7,573,987 B1 * | 8/2009 | Block et al. | 379/88.13 |
| 7,912,067 B2 | 3/2011 | Dalton et al. | 370/395.42 |
| 2002/0016786 A1 | 2/2002 | Pitkow et al. | 707/3 |

(Continued)

FOREIGN PATENT DOCUMENTS

WO    WO 2005/109734    11/2005

OTHER PUBLICATIONS

Office Action mailed Jul. 20, 2010, in U.S. Appl. No. 11/441,519.

(Continued)

*Primary Examiner* — John Blanton
*Assistant Examiner* — Tito Pham
(74) *Attorney, Agent, or Firm* — Merchant & Gould

(57) ABSTRACT

A method and system for processing contextual information relating to an exchange of a conversation over a communication channel is provided. Several users, and/or service providers are allowed to specify a set of rules relating to a conversation channel. Contextual information, including information relating to the specified set of rules and conditions of the users, is exchanged among the users and/or several service providers when one user requests to initiate a communication channel. The received contextual information is processed to extract a set of rules and the current conditions of users. If the current conditions of the users satisfy the set of rules, a corresponding communication channel is established among the users. However, additional contextual information may be received and processed whenever there is a change in the contextual information during the conversation. Appropriate actions to the existing communication channel may be determined based on the changes.

20 Claims, 21 Drawing Sheets

U.S. PATENT DOCUMENTS

| | | | |
|---|---|---|---|
| 2002/0027901 A1 | 3/2002 | Liu et al. | 370/352 |
| 2002/0035474 A1 | 3/2002 | Alpdemir | 704/270 |
| 2002/0085696 A1 | 7/2002 | Martin et al. | 379/201.03 |
| 2003/0018692 A1 | 1/2003 | Ebling et al. | 709/108 |
| 2003/0031165 A1 | 2/2003 | O'Brien, Jr. | 370/352 |
| 2003/0063590 A1 | 4/2003 | Mohan et al. | 370/338 |
| 2003/0108161 A1 | 6/2003 | Brown et al. | 379/88.01 |
| 2003/0130864 A1 | 7/2003 | Ho et al. | 705/1 |
| 2003/0138085 A1 | 7/2003 | Forman et al. | 379/142.01 |
| 2004/0028049 A1* | 2/2004 | Wan | 370/394 |
| 2004/0053573 A1 | 3/2004 | Karusawa | 455/41.2 |
| 2004/0076139 A1* | 4/2004 | Kang-Yeh et al. | 370/349 |
| 2004/0168090 A1 | 8/2004 | Chawla et al. | 713/201 |
| 2004/0203886 A1 | 10/2004 | Rohles et al. | 455/456.1 |
| 2004/0240642 A1 | 12/2004 | Crandell et al. | 379/88.22 |
| 2005/0091328 A1 | 4/2005 | Saeidi | 709/206 |
| 2005/0117586 A1* | 6/2005 | Ikeda et al. | 370/395.21 |
| 2006/0029190 A1 | 2/2006 | Schultz | 379/88.01 |
| 2006/0067498 A1* | 3/2006 | Plas et al. | 379/201.01 |
| 2006/0153357 A1* | 7/2006 | Acharya et al. | 379/266.01 |
| 2006/0161632 A1* | 7/2006 | Wu et al. | 709/206 |
| 2006/0198310 A1 | 9/2006 | Stieglitz et al. | 370/241 |
| 2007/0047726 A1 | 3/2007 | Jabbour et al. | 379/373.02 |
| 2007/0077914 A1 | 4/2007 | Plestid et al. | 455/411 |
| 2007/0133524 A1 | 6/2007 | Kwon | 370/356 |
| 2007/0230439 A1 | 10/2007 | Milstein et al. | 370/352 |
| 2007/0237149 A1 | 10/2007 | Milstein et al. | 370/392 |
| 2007/0253407 A1 | 11/2007 | Wang et al. | 370/352 |
| 2007/0263607 A1 | 11/2007 | Milstein et al. | 370/356 |
| 2007/0270126 A1 | 11/2007 | Forbes et al. | 455/411 |
| 2007/0274293 A1 | 11/2007 | Forbes et al. | 370/352 |
| 2007/0280225 A1 | 12/2007 | Forbes et al. | 370/389 |
| 2008/0266377 A1* | 10/2008 | Kim et al. | 348/14.02 |

OTHER PUBLICATIONS

Office Action mailed Apr. 29, 2010 in U.S. Appl. No. 11/415,323.
Office Action mailed Jun. 9, 2010 in U.S. Appl. No. 11/394,578.
Office Action mailed Jun. 14, 2010 in U.S. Appl. No. 11/444,799.
Office Action mailed Jul. 6, 2010, in U.S. Appl. No. 11/437,596.
Office Action mailed Dec. 15, 2010, in U.S. Appl. No. 11/444,799.
Office Action mailed Aug. 19, 2009, in U.S. Appl. No. 11/437,596.
Office Action mailed Aug. 3, 2009, in U.S. Appl. No. 11/444,799.
Office Action mailed Dec. 4, 2008, in U.S. Appl. No. 11/444,799.
Office Action mailed Jan. 2, 2009, in U.S. Appl. No. 11/437,596.
Office Action mailed Nov. 18, 2009, in U.S. Appl. No. 11/444,799.
Office Action mailed Jan. 12, 2010, in U.S. Appl. No. 11/437,596.
Office Action mailed Dec. 21, 2010, in U.S. Appl. No. 11/437,596.
Office Action mailed Feb. 1, 2011, in U.S. Appl. No. 11/441,519.
Office Action mailed Oct. 1, 2010, in U.S. Appl. No. 11/394,578.
Office Action mailed Oct. 7, 2010, in U.S. Appl. No. 11/415,323.
Office Action mailed Jul. 20, 2011, in U.S. Appl. No. 11/437,596.
Office Action mailed Jul. 27, 2011, in U.S. Appl. No. 11/444,799.
Office Action mailed Nov. 8, 2011, in U.S. Appl. No. 11/415,323.
Office Action mailed Apr. 22, 2011, in U.S. Appl. No. 11/415,323.

* cited by examiner

VOIP CONTEXTUAL INFORMATION PROCESSING

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not allow users to specify preferences or a set of rules relating to processing VoIP data packets.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for processing contextual information relating to an exchange of a conversation over a communication channel is provided. Several users and/or service providers are allowed to specify a set of rules relating to a conversation channel. Contextual information, including information relating to the specified set of rules and conditions of the callee or the caller, is exchanged among the users and/or several service providers when at least one user requests to initiate a communication channel. The received contextual information is processed to extract and/or update a set of rules and the current conditions of the users. If the current conditions of the users satisfy the set of rules, a corresponding communication channel is established among the users. However, additional contextual information may be received and processed whenever there is a change in the contextual information during the conversation. Appropriate actions to the existing communication channel may be determined based on the changes. In accordance with an aspect of the invention, a method for processing contextual information relating to an exchange of a conversation on a communication channel is provided. First contextual information relating to a first client may be obtained, and a set of rules may be determined by processing the obtained first contextual information. Second contextual information relating to a second client may be obtained, and the current conditions of the second client may be determined by processing the second contextual information. The set of rules with the current conditions of the second client may be compared to determine whether the current conditions of the second client satisfy the set of rules specified by the first client. A communication channel connection may be established and/or maintained as indicated by the set of rules if the current conditions of the second client satisfy the set of rules specified by the first client. The set of rules may include a rule indicating a desired location of the first client and/or the second client for the exchange of conversation, desired clients who can exchange a conversation over the communication channel, a desired subject relating to the conversation, and the conditions of the clients, among others.

In an aspect of the method, additional contextual information corresponding to changes in the set of rules or the current conditions of the clients may be received. In one embodiment, upon receipt of the additional contextual information relating to changes in the first client, the set of rules may be dynamically updated during the conversation, based on the additional contextual information. Likewise, upon receipt of the additional contextual information relating to changes made in the second client, the current conditions of the second client may be dynamically updated during the conversation, based on the additional contextual information.

In accordance with another aspect of the present invention, a computer-readable medium having computer-executable components for processing contextual information relating to a conversation on a communication channel is provided. The computer-executable components include a processing module component for obtaining the contextual information and determining a set of rules related to the communication channel by processing the contextual information. The computer-executable components further include a managing module component for establishing a communication channel connection in accordance with the set of rules. Based on the set of rules, the managing module component may reject a request to establish the communication channel. Upon receipt of the additional contextual information relating to the set of rules, the processing module component updates the set of rules by incorporating the additional contextual information. The managing module component may terminate an existing communication channel connection in accordance with the updated set of rules.

In accordance with yet another aspect of the invention, a method for establishing a communication channel in accordance with client specified preferences is provided. A computing device receives a request to establish a communication channel for an exchange of conversation between a caller and a callee. Upon receipt of the request to establish a communication channel, the computing device obtains callee's contextual information and caller's contextual information. The computing device determines callee's rules by processing the callee's contextual information. The computing device determines caller's current conditions by processing the caller's contextual information. The computing device compares the caller's current conditions with the callee's rules. If the caller's current conditions satisfy the callee's rules, a communication channel connection between the callee and the caller is established as indicated by the set of rules. If the caller's current conditions do not satisfy the callee's rules, the computing device executes appropriate actions based on the caller's and callee's contextual information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for processing contextual information relating to a conversation over a communication channel. More specifically, the present invention relates to a method and system for establishing a conversation channel based on client-specified rules and conditions by utilizing contextual information of clients in conjunction with "structured hierarchies". "Structured hierarchies," as used herein, are predefined organizational structures for arranging contextual information to be exchanged between two or more VoIP devices. For example, structured hierarchies may be XML namespaces. Further, a VoIP conversation is a data stream of information related to a conversation, such as contextual information and voice information, exchanged over a conversation channel. Although the present invention will be described with relation to illustrative structured hierarchies and an IP telephony environment, one skilled in the relevant art will appreciate that the disclosed embodiments are illustrative in nature and should not be construed as limiting.

Figure 1:
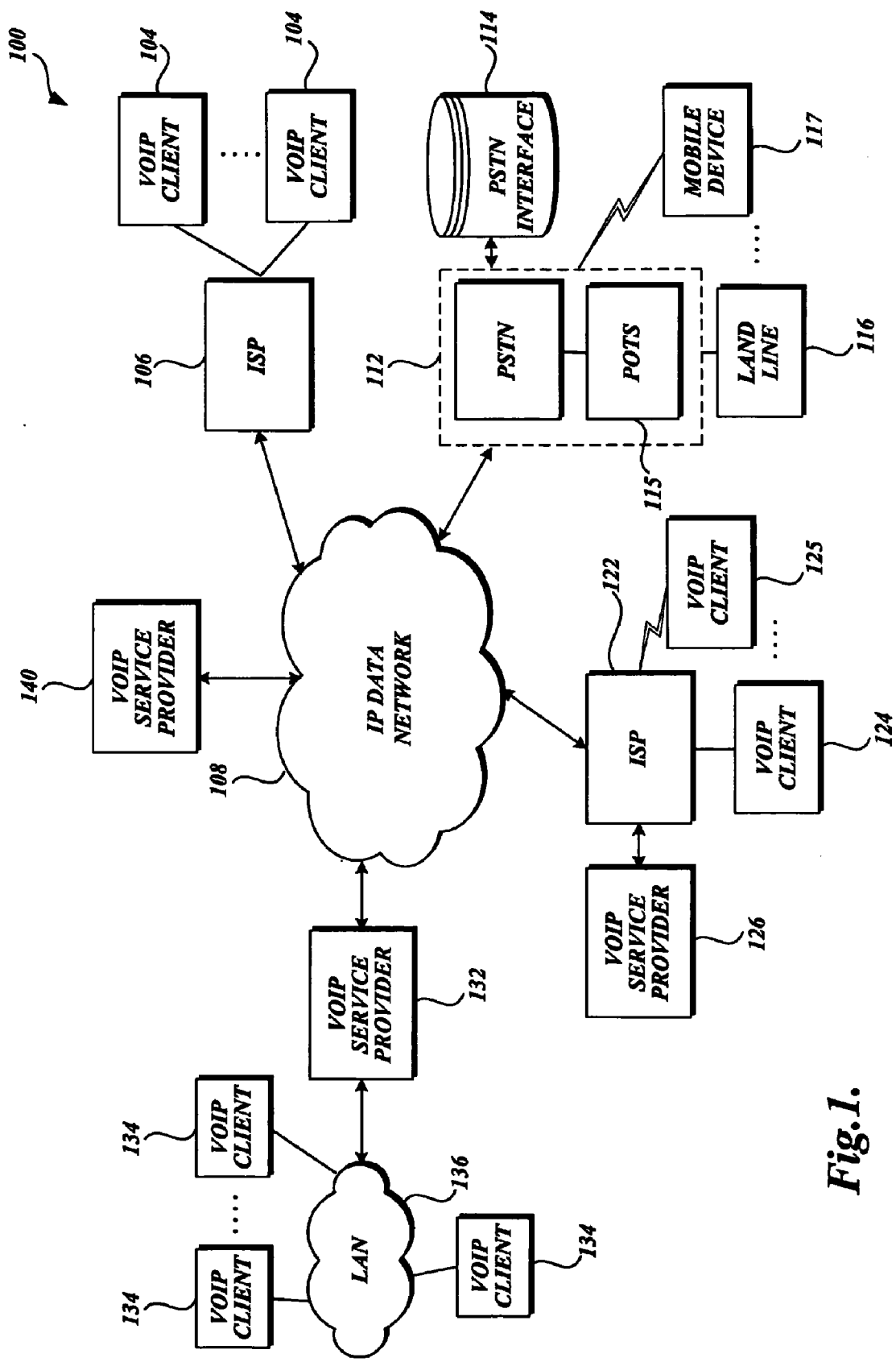
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. The VoIP service providers 126, 132, 140 may also generate, maintain, and provide voice profiles for individuals communicating in a call conversation. As an alternative, or in addition thereto, VoIP clients 104, 124, 125, 136 may create, maintain, and provide voice profiles.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique client identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the environment 100 is merely exemplary. It will be appreciated by one of ordinary skill in the art that various VoIP entities on Internet, intranet, and/or any combination of networks suitable for exchanging media and contextual information can be part of the environment 100. For example, VoIP clients 134 coupled to LAN 136 may be able to communicate with other VoIP clients 104, 124, 125, with or without VoIP service provider 132. Further, an ISP 106, 122 can also provide VoIP services to its client.

Figure 2:
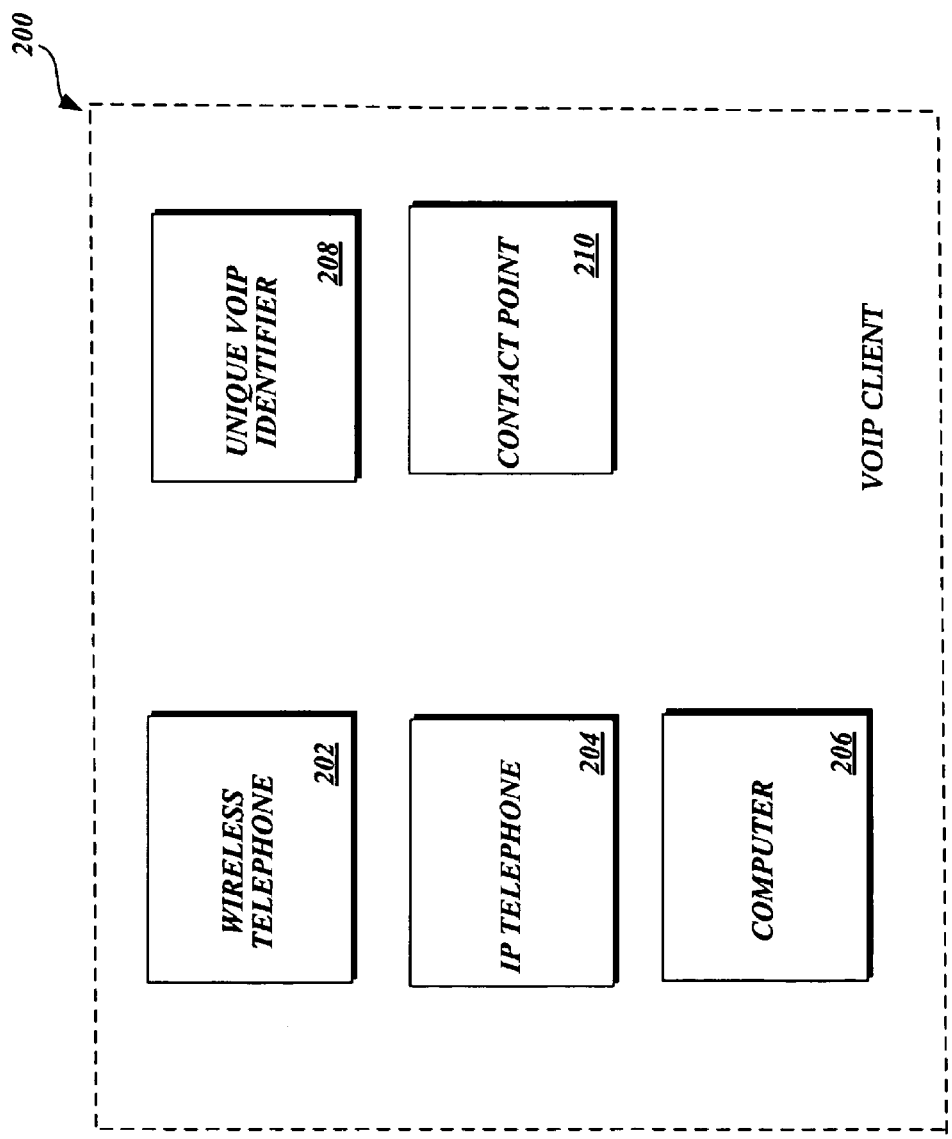
FIG. 2 is a block diagram illustrative of a VoIP client in accordance with an aspect of the present invention.

Referring now to FIG. 2, a block diagram illustrating an exemplary VoIP client 200 that includes several VoIP devices and a unique client identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique client identifiers 208. The unique client identifier(s) 208 may be constant or change over time. For example, the unique client identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect for incoming communications. In an alternative embodiment, the VoIP client 200 may maintain multiple client identifiers. In this embodiment, a unique client identifier may be temporarily assigned to the VoIP client 200 for each call session.

The unique client identifier may be used similar to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
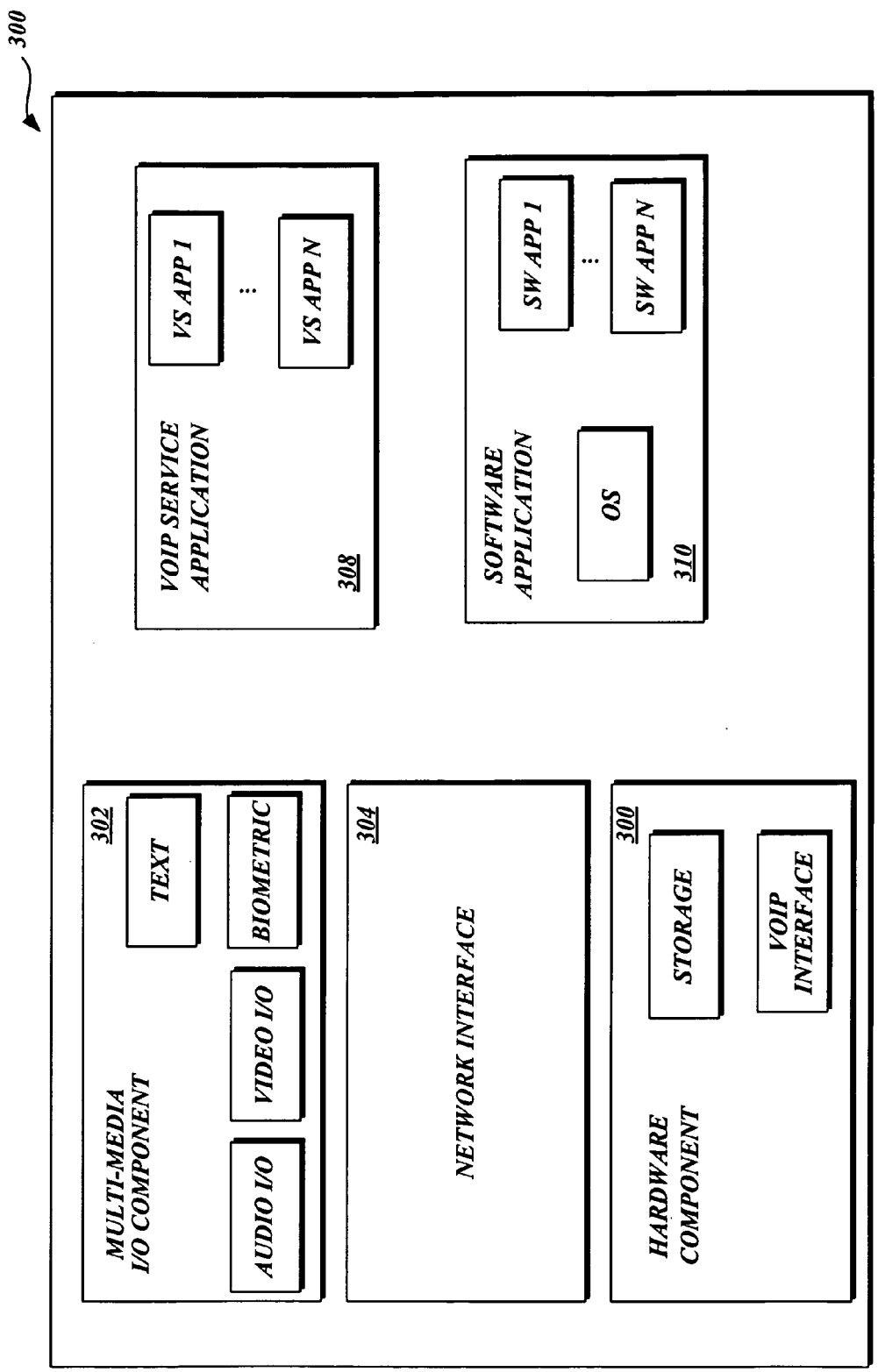
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc.) associated with the VoIP client in which the device is included. In one embodiment, the hardware component 306 may include a VoIP interface card which allows a non-VoIP device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
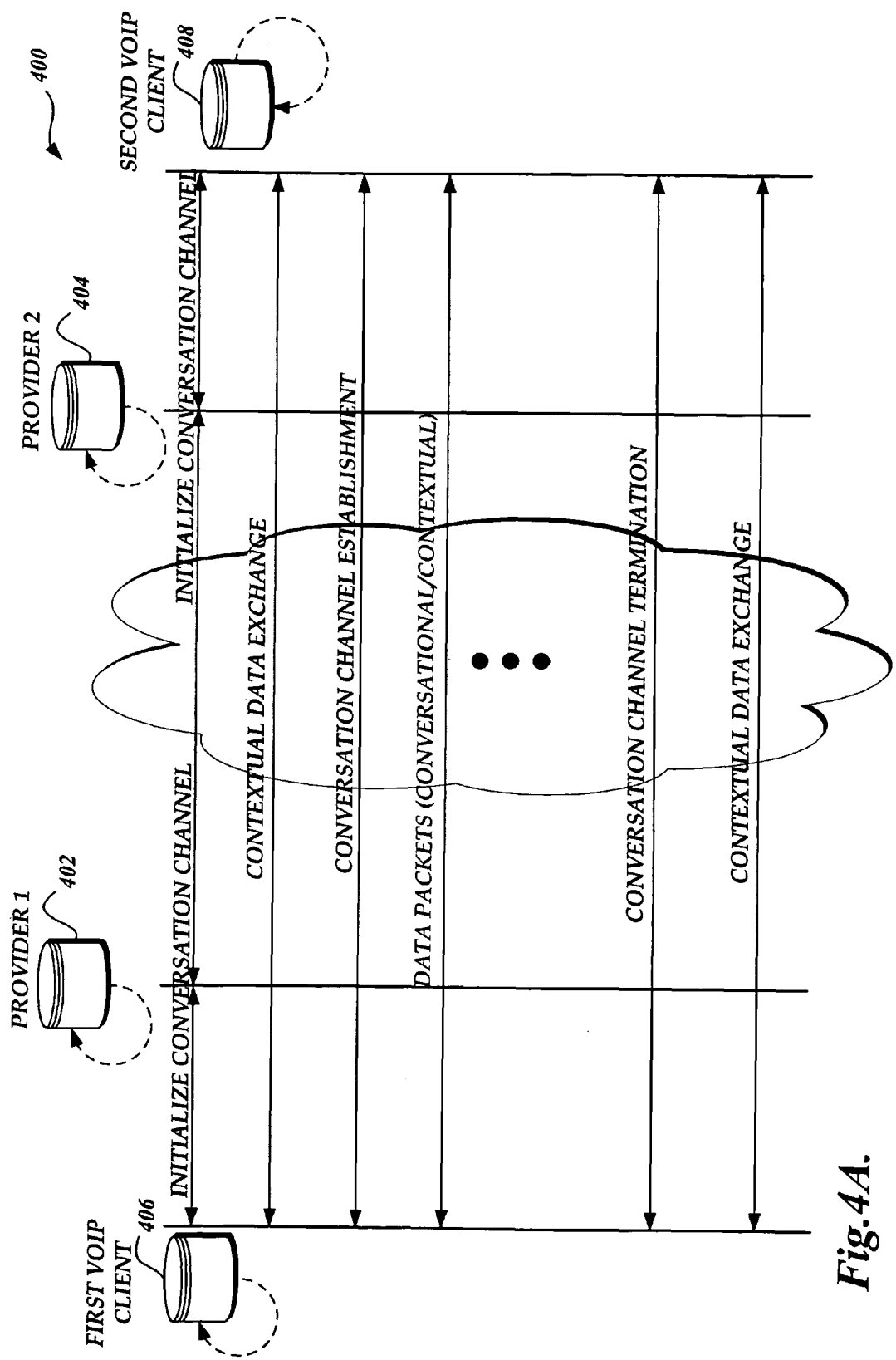
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique identifier of the client that is to be called. Provider 1 402 receives the request from the device of the first VoIP client 408 and determines a terminating service provider (e.g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include a priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
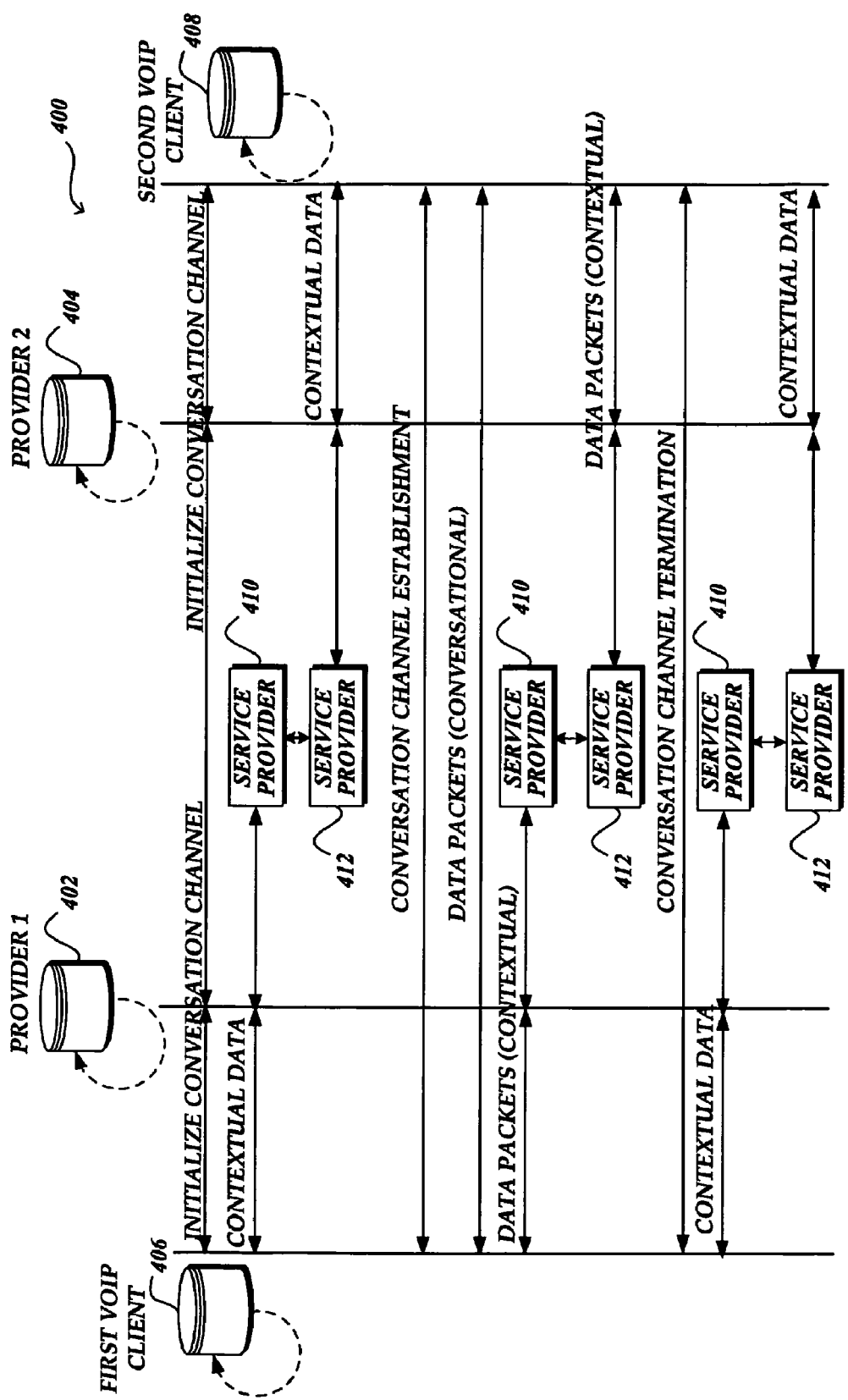

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
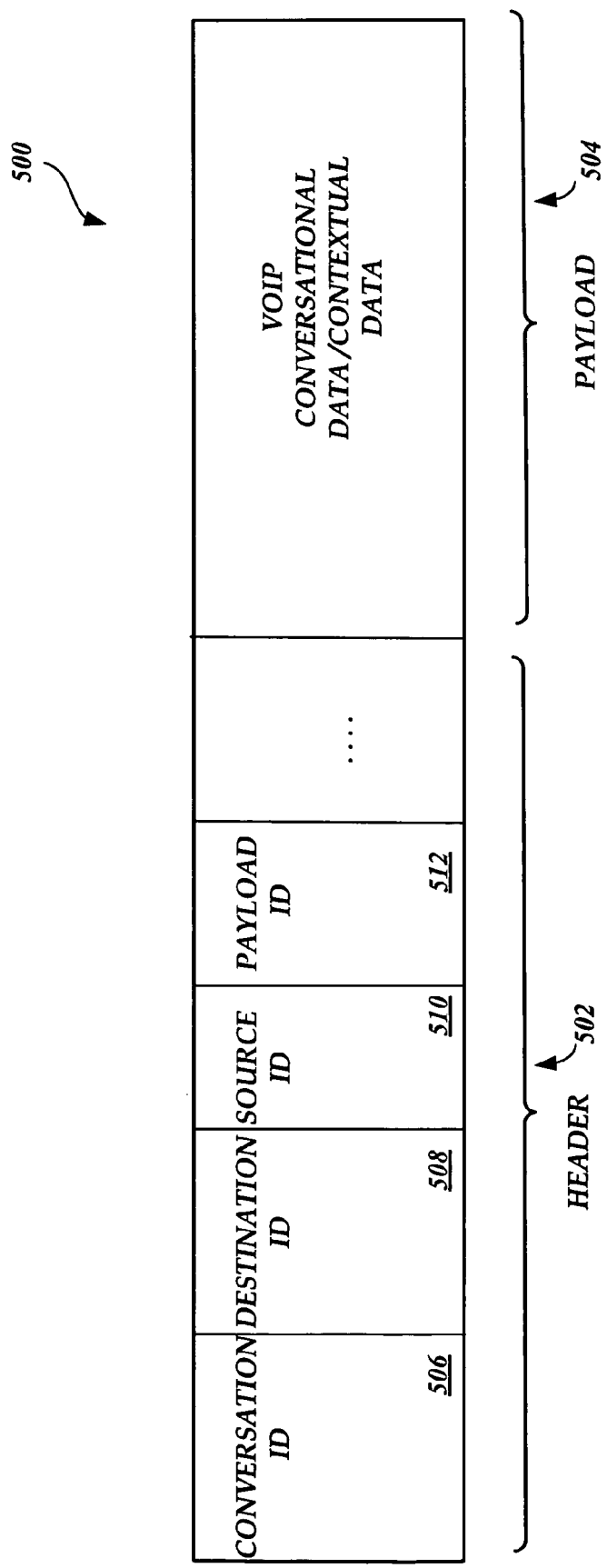
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique client identifier of the client being called, a Source ID 510 (unique client identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context) and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, the VoIP client's confidential information will be deleted by the VoIP service provider associated with that client unless the client authorizes such information to be transmitted. In some cases, a minimal amount of contextual information is transmitted outside of an intranet network. No contextual information may be transmitted.

Figure 6:
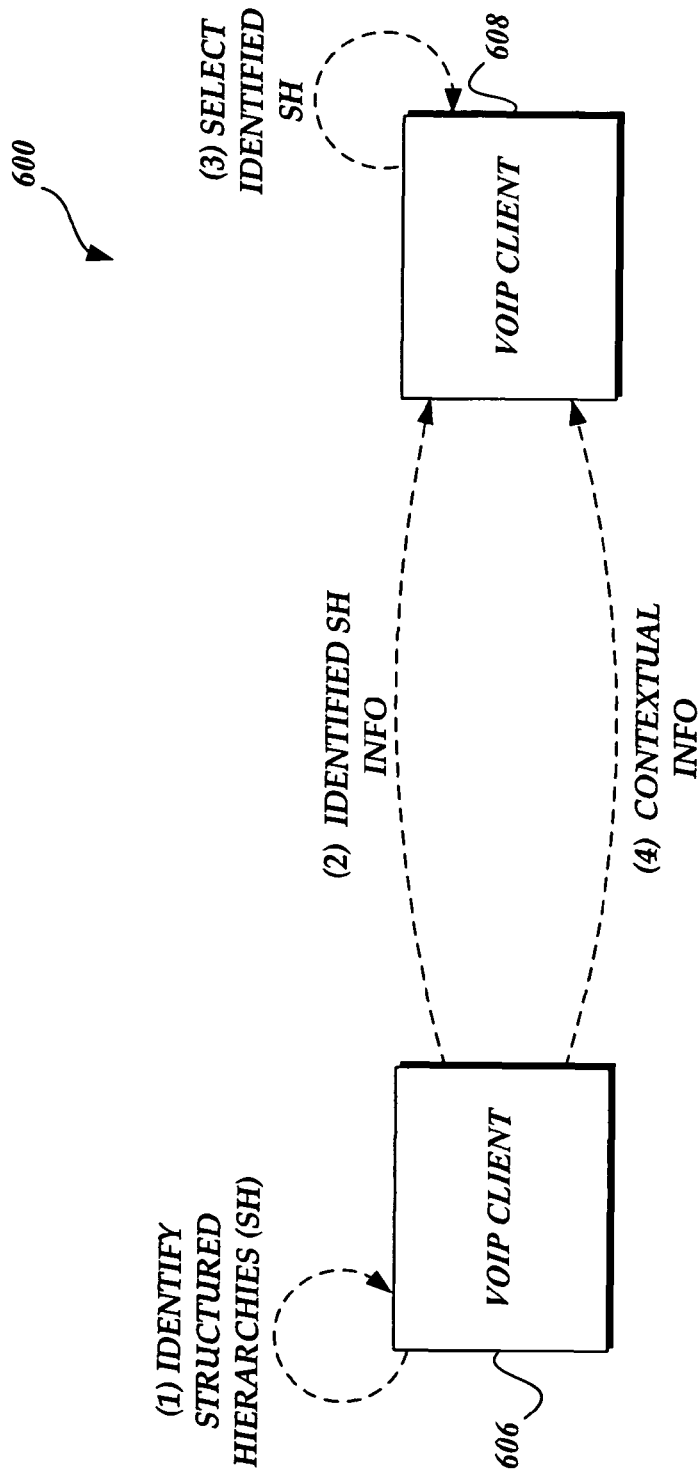
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information identifying which structured hierarchies will be used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
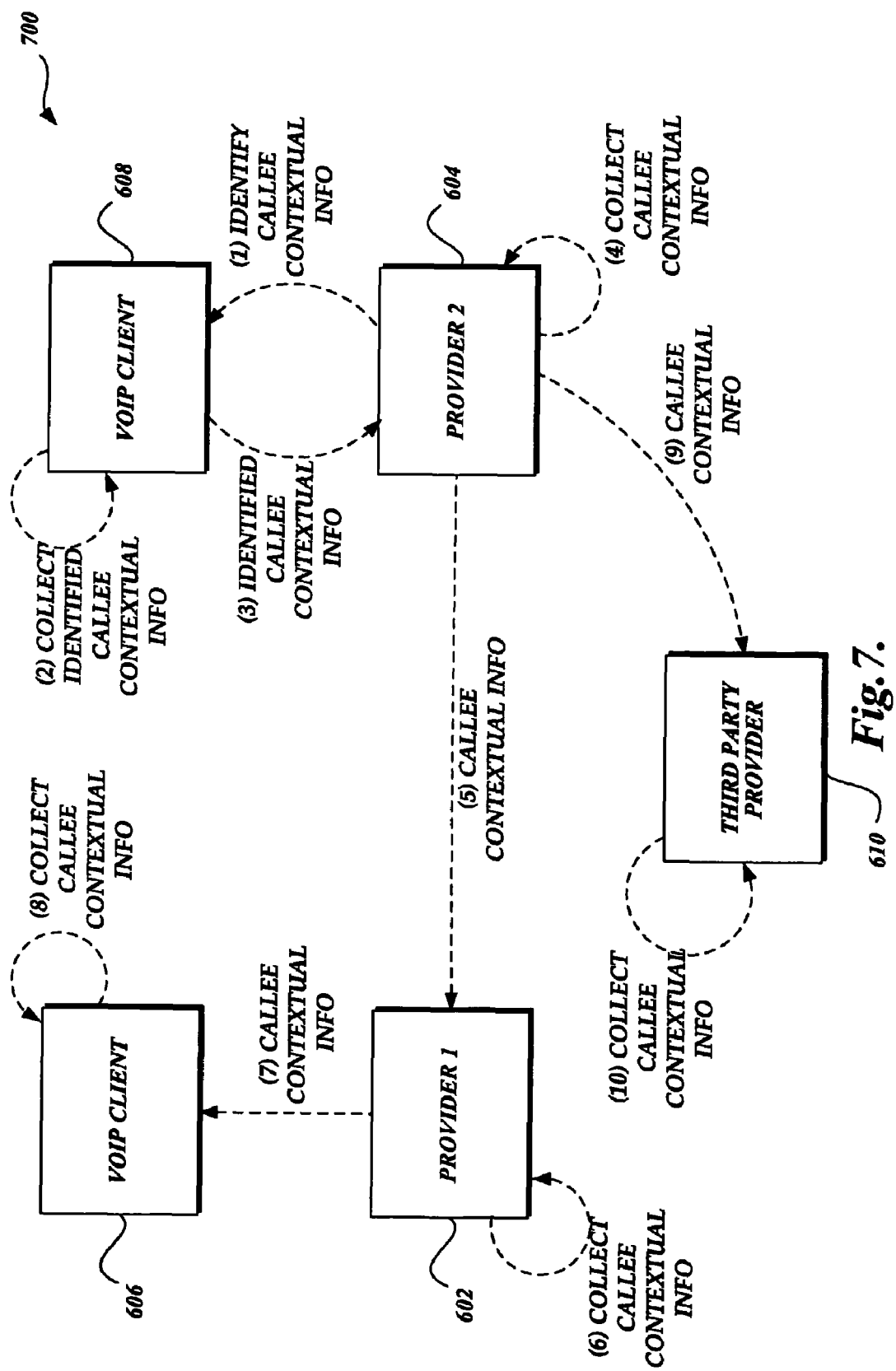
FIG. 7 is a block diagram illustrating interactions between two clients for collecting and transferring contextual information in accordance with an aspect of the present invention.
Figure 8:
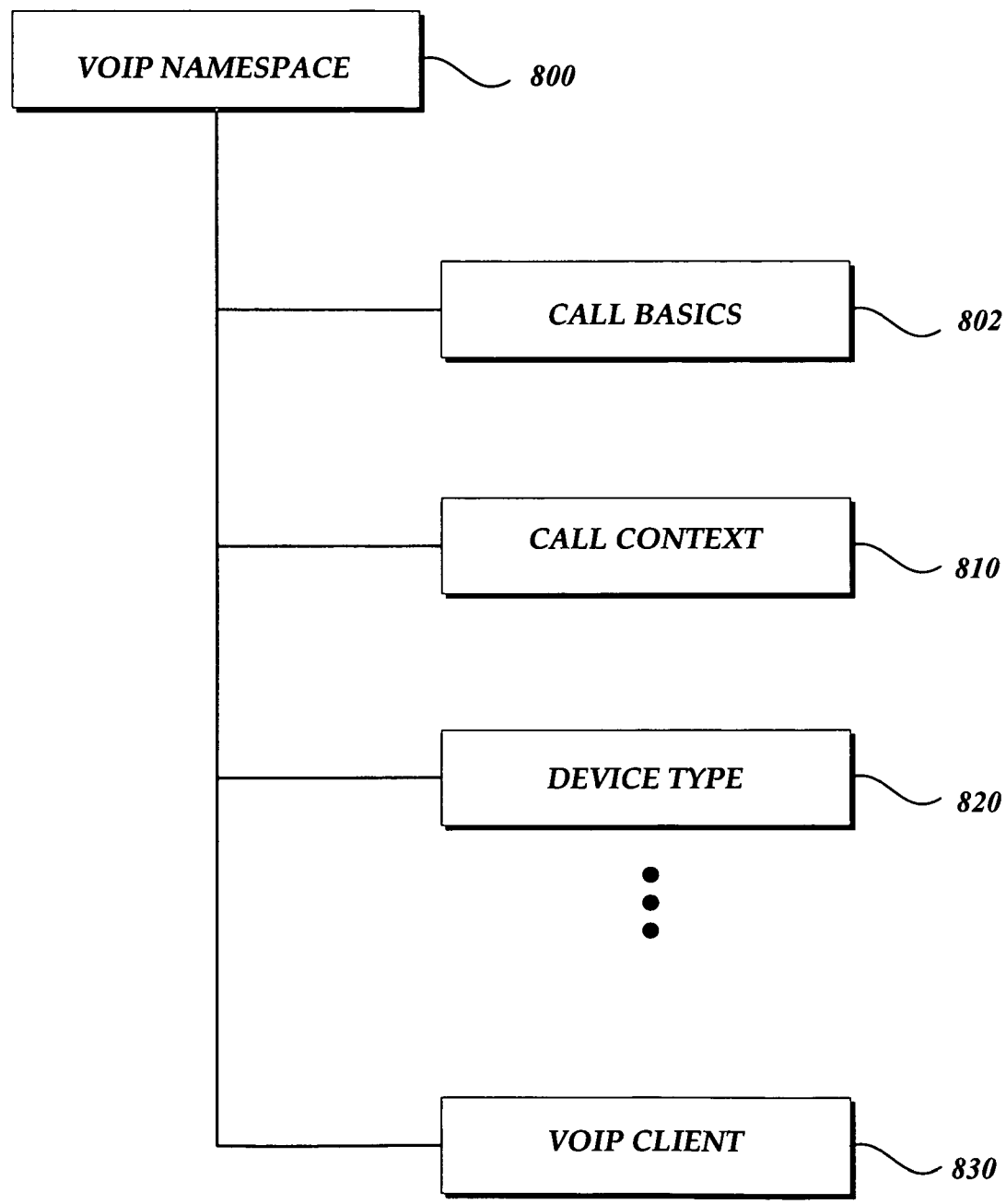
FIGS. 8-12 are block diagrams illustrative of various attributes and classes of structured hierarchies corresponding to VoIP contextual information in accordance with an aspect of the present invention.

With reference to FIG. 7, a block diagram 700 illustrating interactions among several VoIP entities for collecting and transferring contextual information via various service providers, in accordance with an embodiment of the present invention, is provided. The VoIP entities may include VoIP clients 606, 608, VoIP service providers 602, 604, third party service providers 610 and the like. While this example utilizes two VoIP service providers and two VoIP clients, any number and combination of VoIP clients and/or service providers may be used with embodiments of the present invention. It is also contemplated that collecting and transferring contextual information can be done numerous times before, during and/or end of the conversation. In one embodiment, a third party service provider 610 may receive contextual information of VoIP Clients 606, 608 from VoIP service providers 602, 604. For discussion purposes, assume that VoIP Client 606 has Provider 1 602 for the VoIP service provider and a third party provider 610 is available for providing additional VoIP services. In one embodiment, VoIP Client 606 and VoIP Client 608 have established a conversation channel between devices of VoIP Client 606 and VoIP Client 608 via Provider 1 602 and Provider 2 604.

During a conversation, Provider 2 604 may identify contextual information which will be obtained from VoIP Client 608. VoIP Client 608 collects the identified contextual information and identifies structured hierarchies which will be used to carry the identified contextual information. The collected contextual information is transmitted from VoIP Client 608 to Provider 2 604. Provider 2 604 may store part of the received contextual information. Further, Provider 2 604 may collect more contextual information, if necessary, and update the received contextual information. Provider 2 604 may add information relating to services provided for VoIP Client 608, such as billing information, rates, and the like.

As mentioned above, the information regarding the identified structured hierarchies is also transmitted from VoIP Client 608 to Provider 2 604. The information regarding the identified structured hierarchy may include the information about which structured hierarchies are used to carry the corresponding contextual information, how to identify the structured hierarchies, and the like. Provider 2 604 transmits the information regarding the identified structured hierarchies and the contextual information to Provider 1 602. Provider 1 602 may collect more contextual information, if necessary, and update the received contextual information. Provider 1

602 sends the information regarding the identified structured hierarchies and the contextual information to VoIP Client 606. Upon receipt of the information regarding the identified structured hierarchies, VoIP Client 606 looks up predefined structured hierarchies to select the identified structured hierarchies for the contextual information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

In an illustrative embodiment, VoIP Client 606 may identify a XML namespace for contextual information. For example, the XML namespace attribute may be placed in the start tag of a sending element. It is to be understood that XML namespaces, attributes, classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 9:
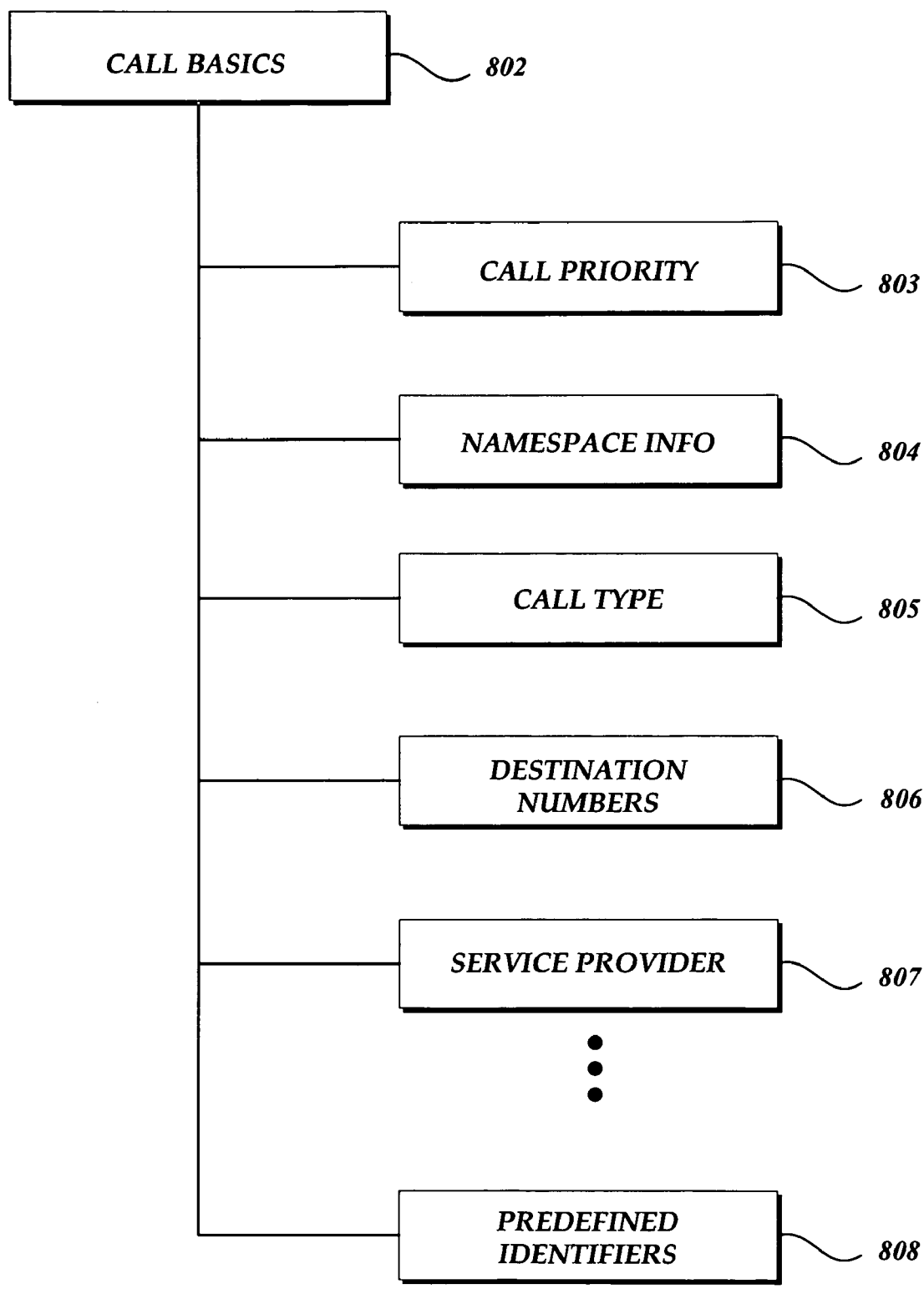

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
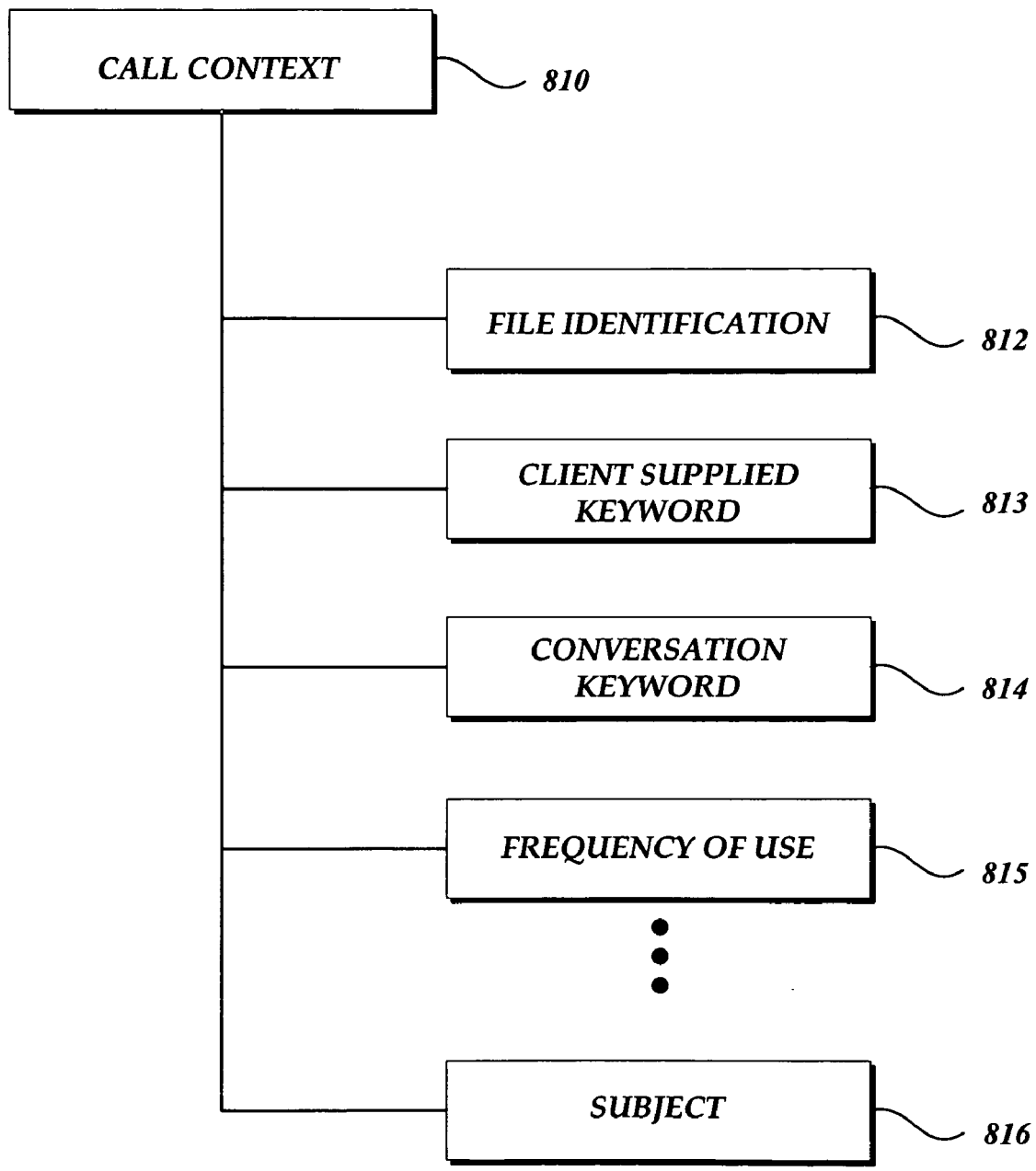

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
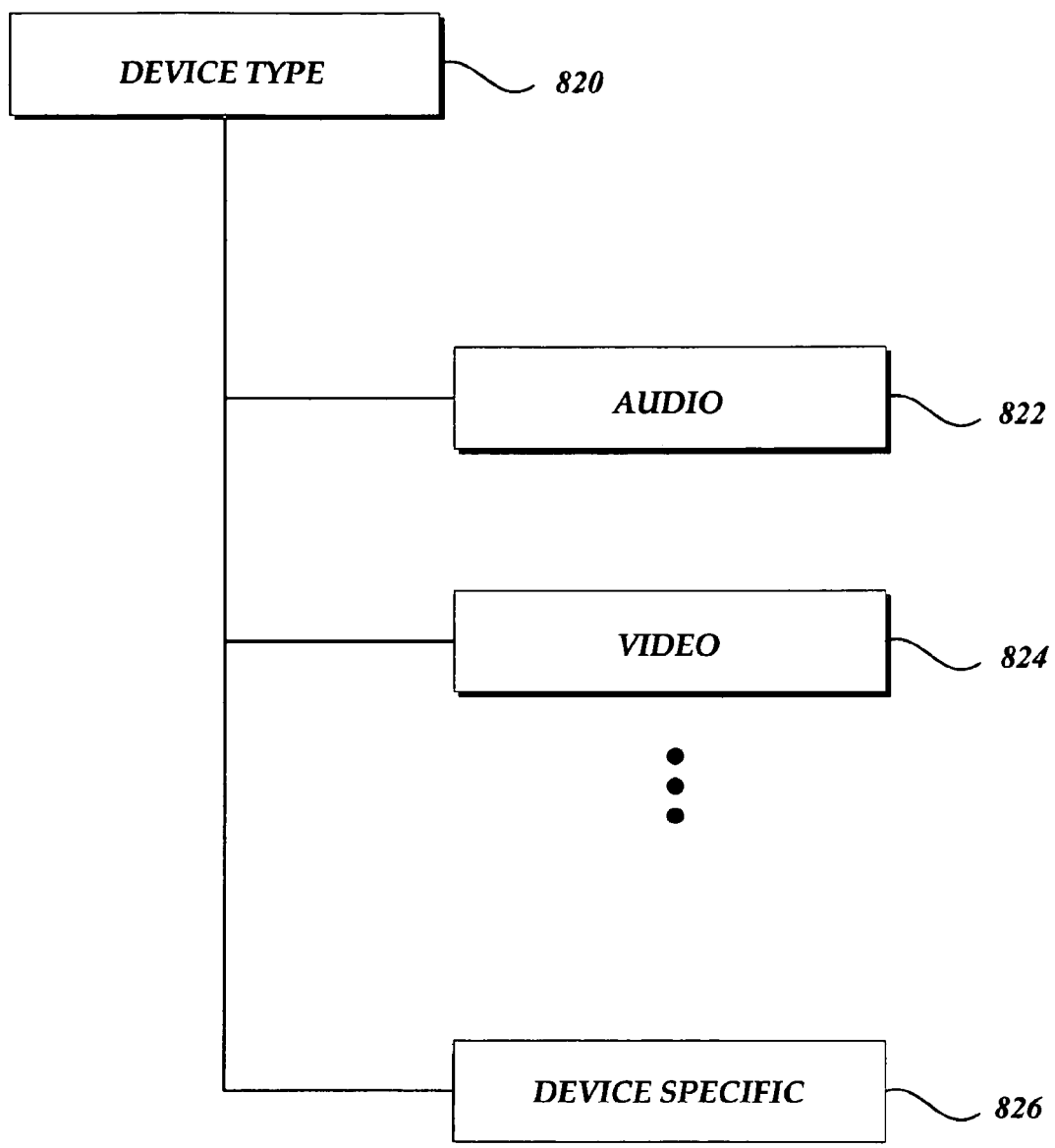

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826 and the like.

Figure 12:
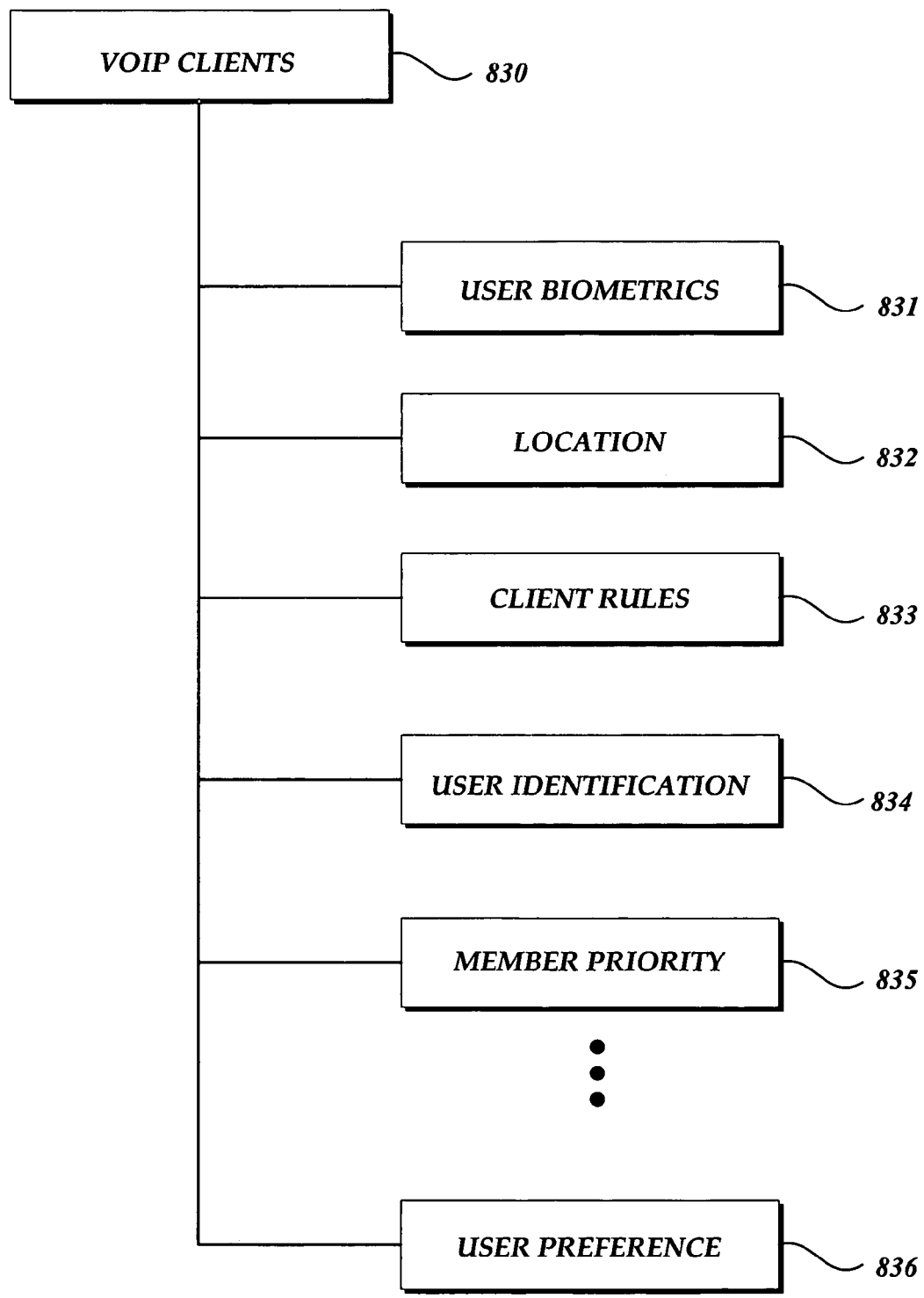

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, and the like.

Figure 13A:
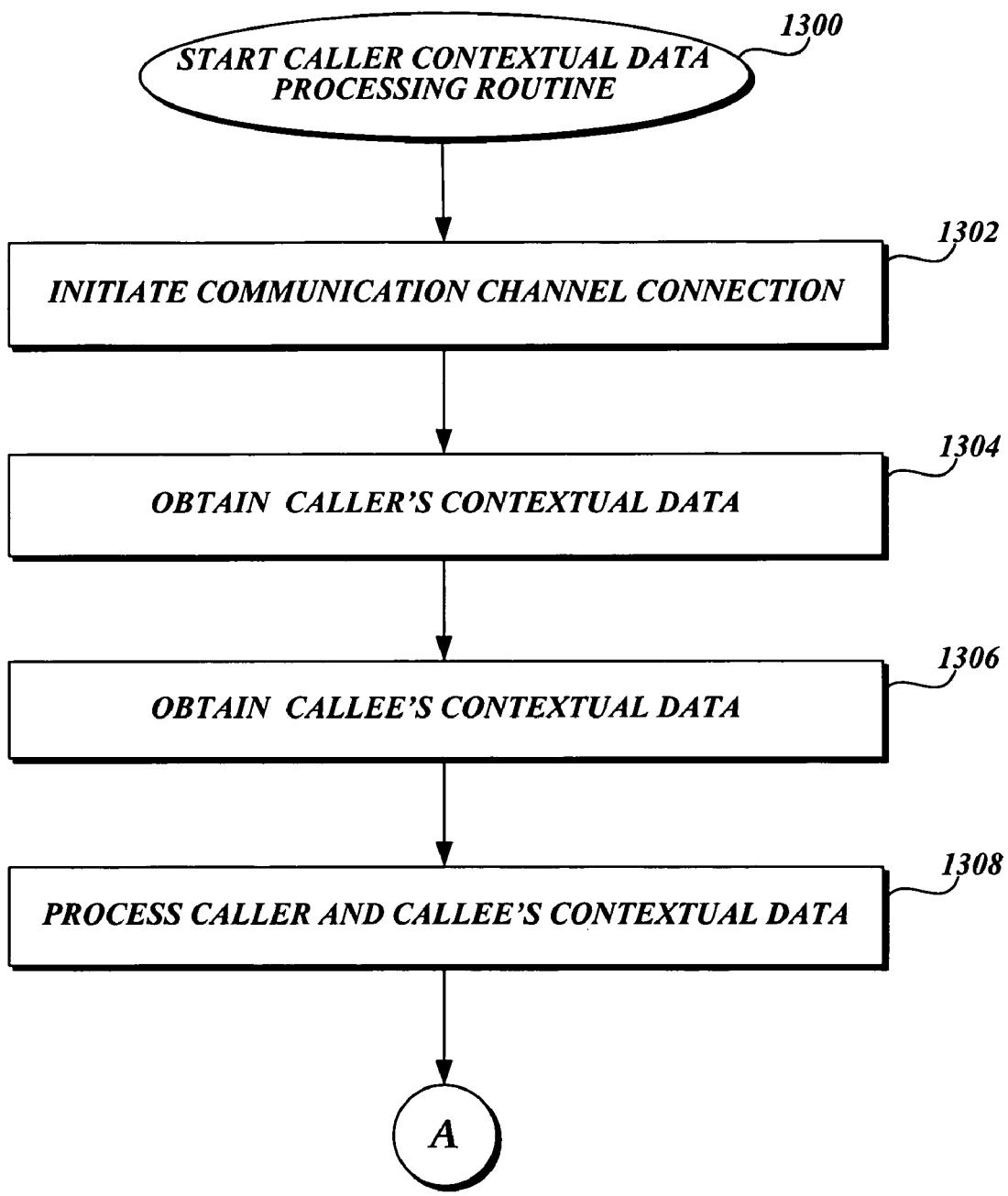
FIGS. 13A and 13B are flow diagrams illustrating a caller-contextual data processing routine in accordance with an aspect of the present invention.
Figure 13B:
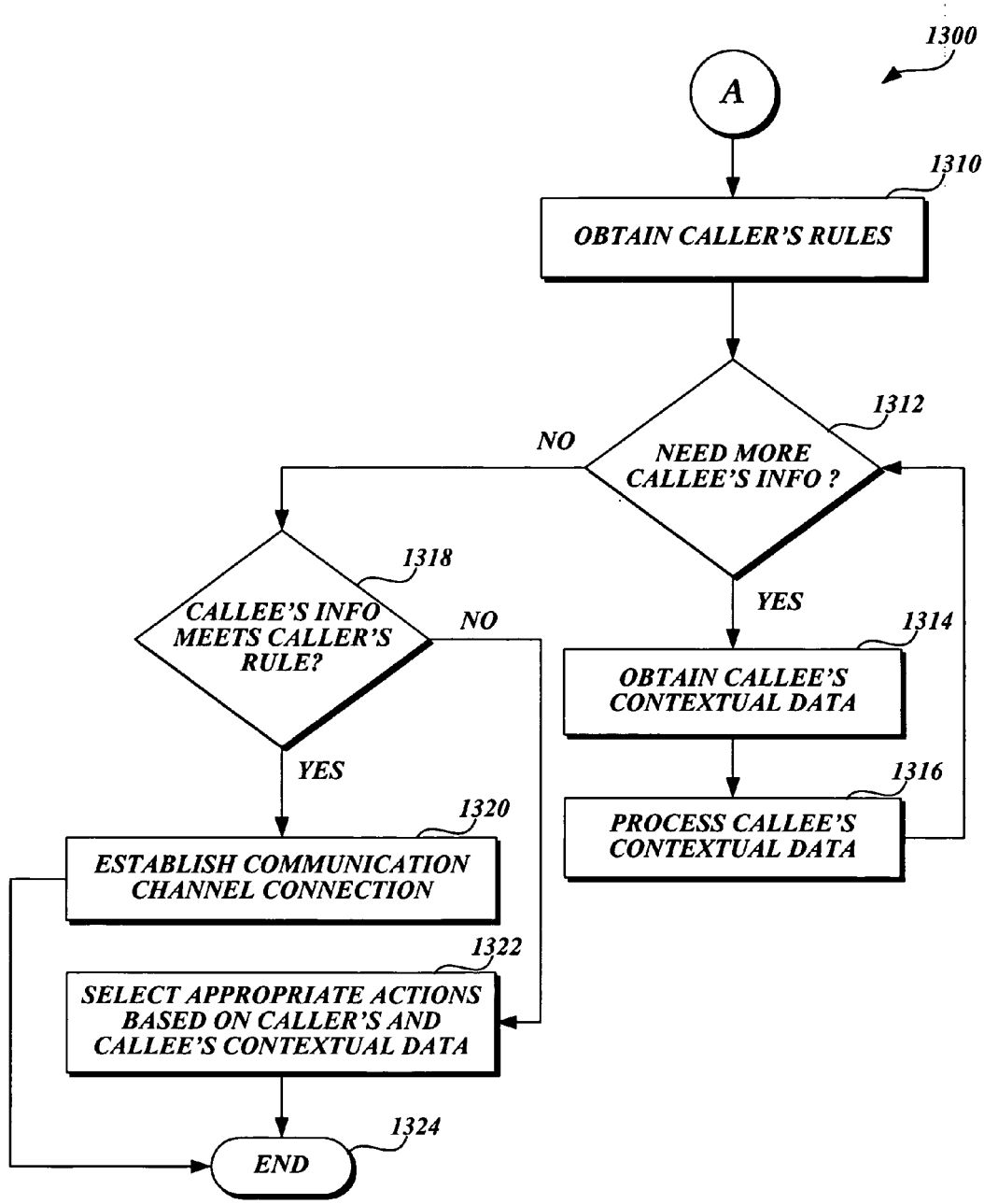

FIGS. 13A and 13B are flowcharts illustrating a caller-contextual data processing routine 1300 for collecting and processing caller contextual information in accordance with an embodiment of the present invention. In an illustrative embodiment, a device of a caller (calling VoIP client) may have requested its associated service provider to initiate a communication channel connection with a callee (called VoIP client).

With reference to FIG. 13A, beginning at block 1302, upon receipt of the request, the service provider of the caller initiates a communication channel connection between devices of a caller and a callee. At block 1304, the service provider of the caller obtains caller's contextual data (contextual information). The caller's contextual information may be obtained directly from the caller or stored on the service provider of the caller. In one embodiment, the service provider of the caller may request to obtain additional contextual information from the caller only if there have been any changes in the caller's contextual information which has been previously obtained. In this manner, the amount of contextual information exchanged between the service provider and the caller can be minimized. Further, in one embodiment, structured hierarchies may be identified and the identification of structured hierarchies may be transmitted for an exchange of the contextual information among the caller, the callee and the services providers. In this embodiment, the contextual information may be represented in accordance with the identified structured hierarchies.

At block 1306, the service provider of the caller obtains the callee's contextual data (contextual information) from the callee (if the callee is also a client of the service provider of the caller) or from a service provider of the callee (if the callee has a separate service provider). The service provider of the caller processes the callee's contextual information and the caller's contextual information at block 1308. The caller-contextual data processing routine 1300 continues to connecting terminal A. (See FIG. 13B).

With reference to FIG. 13B, starting from terminal A, the caller-contextual data processing routine 1300 proceeds to block 1310 where the service provider of the caller obtains the caller's rules based on the processed contextual information. In one embodiment, the caller is allowed to specify caller rules, including a set of rules identifying a geographic location of the callee, desirable callee's mood or stress level, desirable callee's VoIP devices, or the like. At decision block 1312, the service provider of the caller determines whether it needs to receive additional contextual information relating to the callee's current conditions. In one embodiment, the callee can limit the amount or the scope of the contextual information to be transmitted to a certain caller, but the service provider of the caller may need additional contextual information to determine whether the callee's current conditions satisfy the caller's rules. In such a case, the service provider of the caller may request additional contextual information relating to the callee's current condition.

If it is determined at decision block 1312 that additional information is needed, the service provider may obtain the callee's additional contextual information at block 1314. At block 1316, the service provider processes the additional callee's contextual information to obtain the callee's conditions. In an alternative embodiment, if the callee has limited the contextual information that can be provided, the service provider of the caller may provide contextual information relating to the conditions to be satisfied and await a result from the callee or callee's service provider. The caller-contextual data processing routine 1300 repeats these steps until the service provider does not need any more callee contextual information. If it is determined at decision block 1312 that additional information is not needed, it is determined at decision block 1318 whether the callee's current conditions meet (satisfy) the caller's rules. If the callee's current conditions satisfy the caller's rules, the service provider establishes a communication channel connection between the caller and the callee as illustrated by block 1320. However, if the callee's current conditions do not satisfy the caller's rules, at block 1322, the service provider of the caller selects appropriate actions based on callee's contextual information and caller's contextual information. For example, the service provider may select an action terminating initiation of the communication channel connection. In one embodiment, the service provider of the callee receives a message relating to the termination from the service provider of the caller. The callee may be also notified about a termination which occurs during the connection set-up phase. In yet another example, the service provider may select an action notifying the callee and the caller of the disagreement between the callee's current conditions and the caller's rules. The caller-contextual data processing routine 1300 completes at block 1324.

Figure 14A:
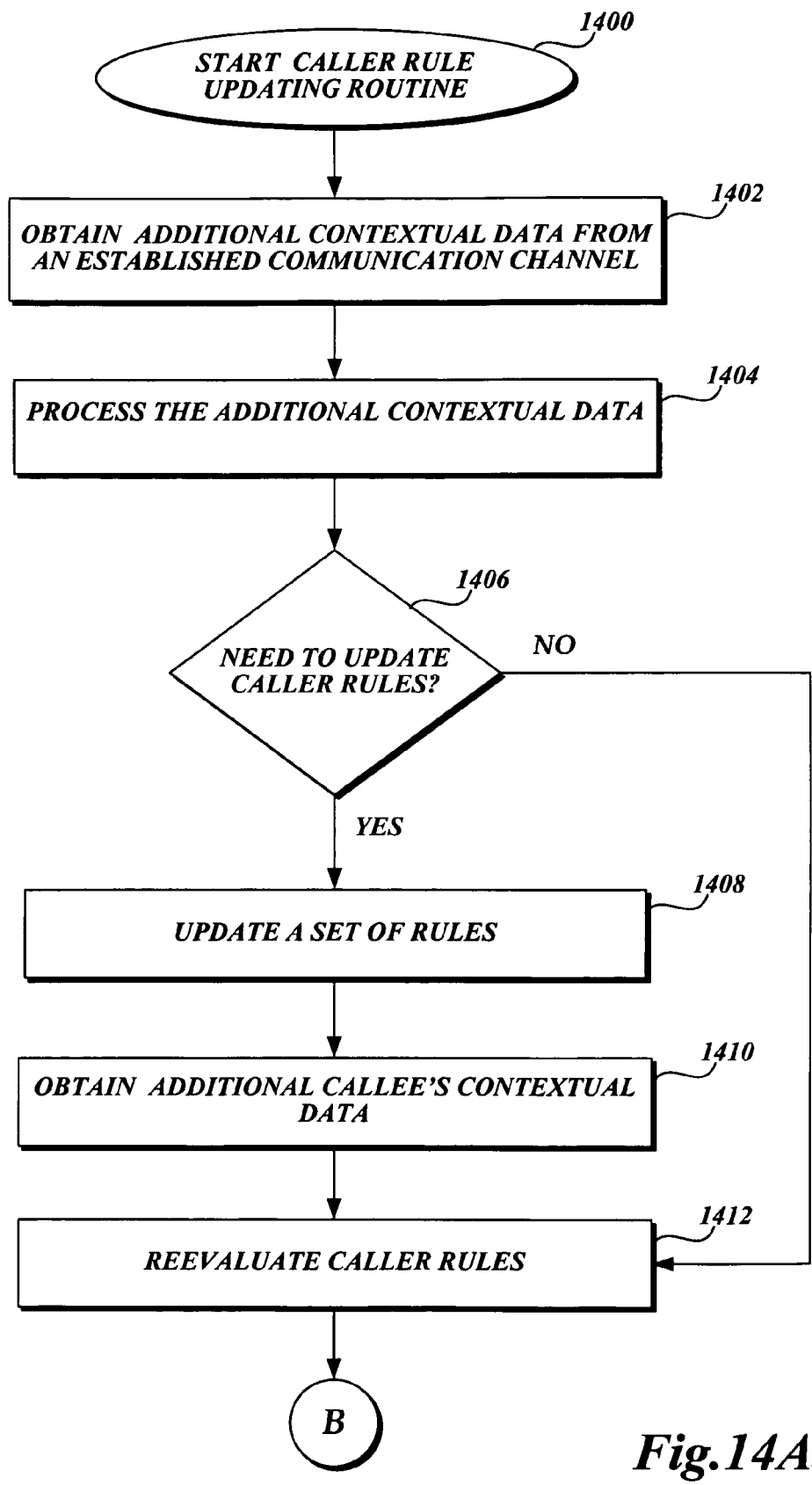
FIGS. 14A and 14B are flow diagrams illustrating a caller-rule updating routine in accordance with an aspect of the present invention.
Figure 14B:
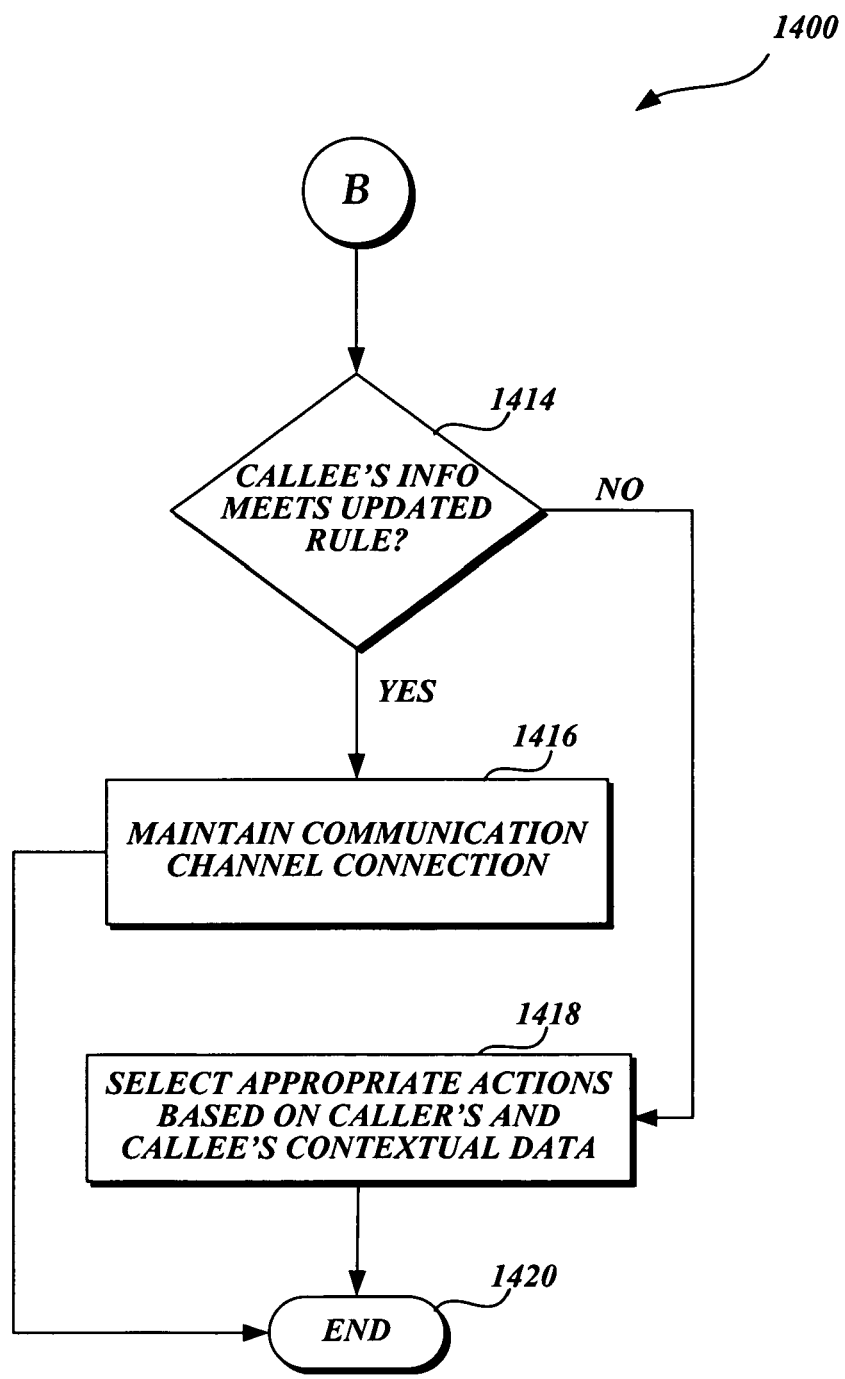

FIGS. 14A and 14B illustrate flow diagrams of caller-rule updating routine 1400 for processing additional contextual information from the existing communication channel in accordance with an embodiment of the present invention. In an illustrative embodiment, a communication channel between devices of a caller and a callee has been established in accordance with the caller's rules and the callee's conditions determined during a connection set-up phase as illustrated in FIGS. 13A and 13B. During the communication, the caller's rules or the callee's conditions may change. For example, the caller rules will be dynamically updated due to changes on the caller's side (e.g., individual user's mood, etc.) or needs of the caller. In response to a change, the updated caller's rules may be dynamically reevaluated to check whether the conditions of callee still satisfy the update caller's rules. In some cases, the existing communication channel may be terminated if the conditions of the callee do not satisfy the updated caller rules. For example, when the existing call was established, the caller already had a set of rules specifying that an individual user would not communicate with a friend while the friend or the individual user is driving. The individual user has an important conversation with a friend who has to drive in the middle of conversation. The caller's rules can be changed to allow the individual user to continue the conversation while the friend is driving. Otherwise, the friend's current conditions (i.e. callee's current conditions) do not satisfy the caller's rules and thus the communication channel would be terminated accordingly.

Beginning at block 1402, the service provider of the caller obtains additional contextual data from an established communication channel. The additional information may be callee or caller contextual information. At block 1404, the service provider of the caller may process the additional contextual data. As mentioned above, the additional contextual data may reflect changes in the caller or the callee. The routine 1400 proceeds to decision block 1406 to determine whether the caller's rules should be updated due to the additional contextual information. If it is determined that the callee's rules need updating, the service provider of the caller updates a set of rules from the caller's rules in accordance with the processed additional information at block 1408. At block 1410, the service provider of the caller may obtain contextual information from the callee, if needed to reevaluate the updated caller's rules. At block 1412, the service provider reevaluates the updated caller's rules (the current caller's rules) with the callee's contextual information. If it is determined at decision block 1406 that the callee's rules do not need to be updated, the routine 1400 periodically reevaluates the callee rules with the callee's current conditions including changes determined from the callee's contextual information as illustrated by block 1412. The routine 1400 proceeds to connecting terminal B. (FIG. 14B).

With reference to FIG. 14B, starting from terminal B, the routine 1400 continues to decision block 1414 to determine whether, upon reevaluation of the caller's rules, the current callee's information (i.e., the current callee's conditions) meets the current caller rules. If it is determined that the rules are still satisfied, the service provider of the caller maintains the established channel connection as illustrated by block 1416. If it is determined that the rules are no longer satisfied, at block 1418, the service provider of the caller selects appropriate actions based on caller's contextual information and callee's contextual information. The service provider of the caller may select an action terminating the established channel connection. Subsequently, the service provider of the caller may send a message relating to the termination to the service provider of the callee. The callee may also be notified about a termination which occurs during the connection set-up phase. In yet another example, the service provider may select an action notifying the callee and the caller of the disagreement between the callee's current conditions and the caller's rules.

In this example, the caller and/or the callee may be notified about the pending termination giving a reason for the termination. Upon receipt of the notification, the caller may be allowed to continue the conversation by temporarily disabling the caller rule(s) corresponding to the termination. The routine 1400 completes at block 1420.

Figure 15A:
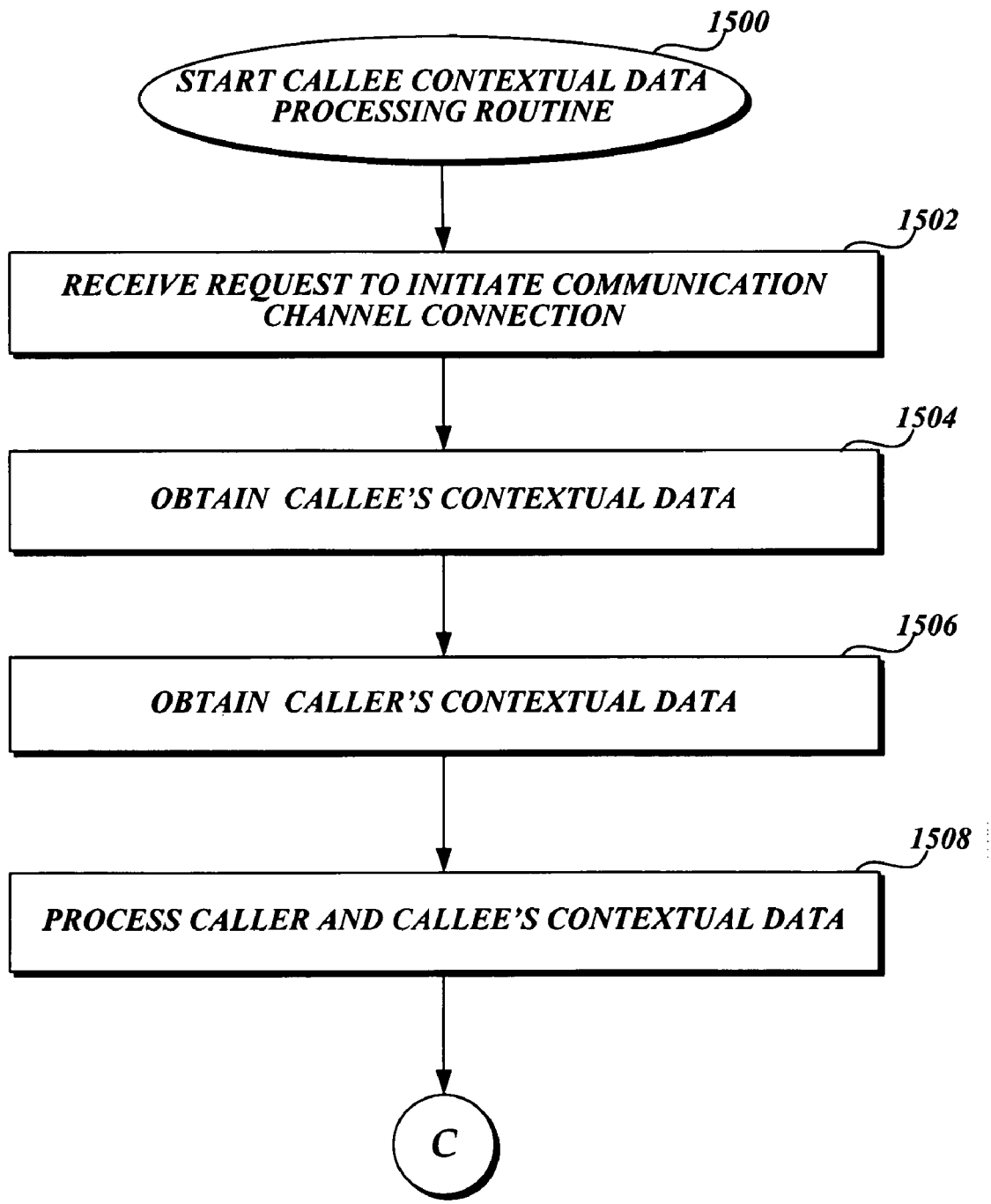
FIGS. 15A and 15B are flow diagrams illustrating a callee-contextual data processing routine in accordance with an aspect of the present invention.
Figure 15B:
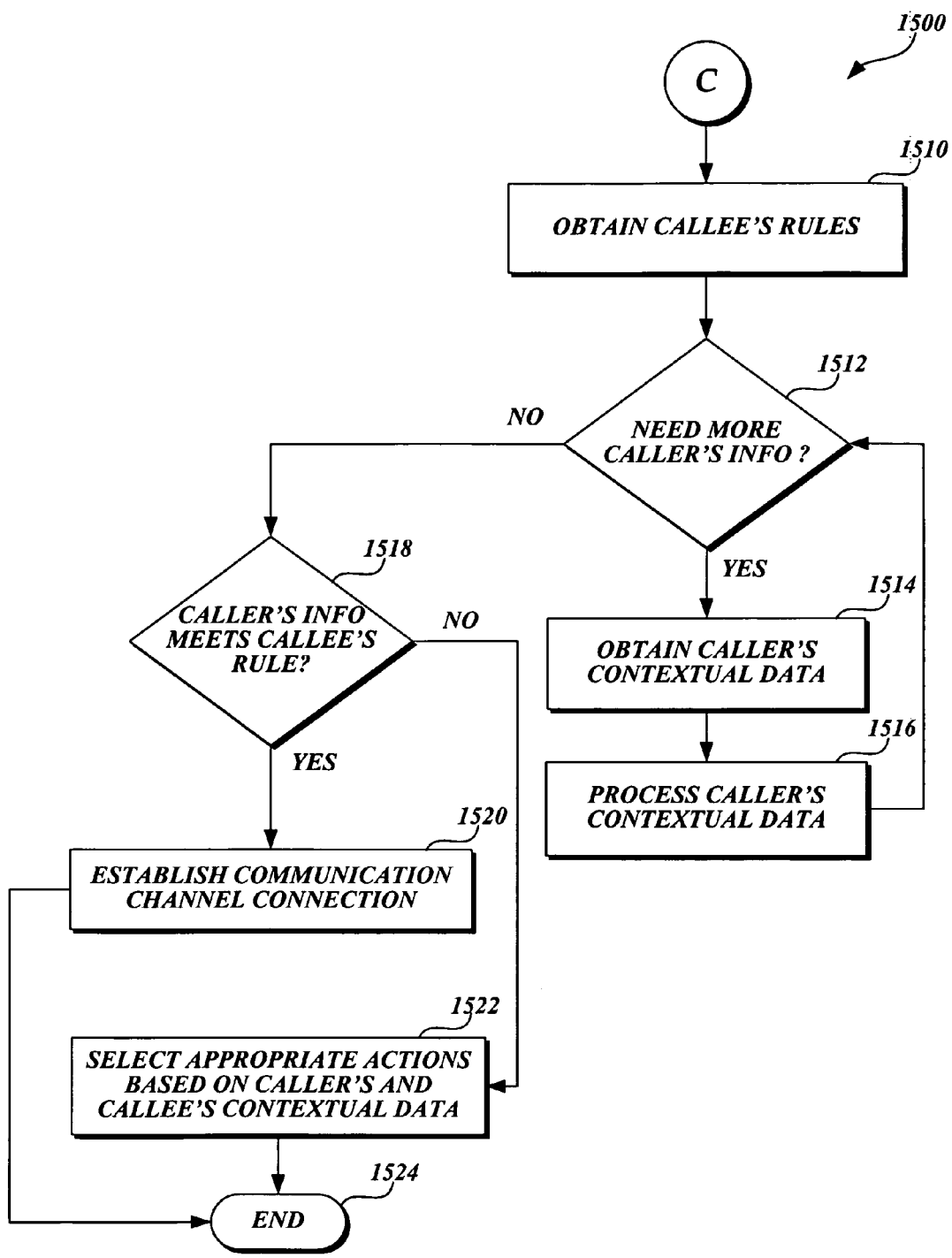

It is to be understood that the embodiments explained in conjunction with the routine 1400 are provided merely for example purposes. It is contemplated that the routine 1400 can also be performed by a VoIP device or a third party service provider. It is further contemplated that a service provider can maintain service provider's rules or predetermined logic for a communication channel connections. For example, if a callee and a caller does not exchange data packets (conversation or contextual) for a time period, the corresponding call session may be terminated (expired) and awaiting for data packets from the caller or the callee. Upon receipt of data packets, a new call session will be established as discussed above with FIG. 14. In one embodiment, new contextual information relating to the caller and the callee will be obtained for the new call session. In another embodiment, previous obtained contextual information relating to the previous channel connection may be used to establish a new call session. In a particular embodiment, the caller and the callee may not aware that the session has been expired and re-established. In this manner, the network bandwidth can be efficiently utilized. Alternatively, the established call session may not be terminated even after a time period, based on the callee's rules, the caller's rules, the service provider's rules and/or the predefined logic. FIGS. 15A and 15B are flowcharts illustrating a callee-contextual data processing routine 1500 for collecting and processing callee contextual information in accordance with an embodiment of the present invention. As with FIGS. 13A and 13B, a device of a caller (a calling VoIP client) may have requested its associated service provider to initiate a communication channel connection with a callee (a called VoIP client). The service provider of the caller transmits the request to initiate the communication channel to the service provider of the callee, or directly to the callee.

With reference to FIG. 15A, the routine 1500 begins with block 1502 where the service provider of the callee receives a request to initiate a communication channel connection between the caller and the callee. At block 1504, the service provider of the caller obtains callee's contextual data (contextual information). In one embodiment, the service provider of the callee may request to obtain additional contextual information from the callee only if there have been changes in the callee's contextual information which have been previously obtained. In this manner, the amount of contextual information exchanged between the service provider and the callee can be minimized. Further, in one embodiment, structured hierarchies may be identified and the identification of structured hierarchies may be transmitted for an exchange of the contextual information among the caller, the callee, and the service providers. In this embodiment, the contextual information may be represented in accordance with the identified structured hierarchies.

At block 1506, the service provider of the callee obtains the caller's contextual data (contextual information) directly from the caller (if the caller is also a client of the service provider of the callee) or from a service provider of the caller (if the caller has its own service provider). The service provider of the callee processes the caller's contextual information and the callee's contextual information at block 1508. The callee-contextual data processing routine 1500 continues to connecting terminal C. (See FIG. 15B)

With reference to FIG. 15B, starting from terminal C, the callee-contextual data processing routine proceeds to block 1510 where the service provider of the callee obtains the callee's rules based on the processed contextual information at block 1510. In one embodiment, the callee is allowed to specify desired callee's rules that include a set of rules specifying a geographic location of the caller and/or the callee, appropriate VoIP device of the callee, desirable mood of an individual user, stress level of an individual user, or the like. In this embodiment, the callee may also include a priority list for a group of potential callers, priority lists for available VoIP devices, and the like. Alternatively, the callee may allow an individual user to specify a priority list for a group of potential callers, priority lists for available VoIP devices, and the like. At decision block 1512, the service provider of the callee may determine whether it needs to receive additional contextual information from the caller. In one embodiment, the caller can limit an amount or scope of the caller's contextual information that will be transmitted to a certain group of callees. In this embodiment, the service provider of the callee may need additional contextual information to determine whether the caller's current conditions satisfy the callee's rules. In such a case, the service provider of the callee may request additional contextual information to determine whether the caller's current conditions satisfy the callee's rules. If the caller limits the exchanged contextual information, in one embodiment, the callee's service provider may provide the rules to the caller's service provider and received response as to whether the rule is satisfied.

If it is determined at decision block 1512 that additional caller's contextual information is needed, the service provider may obtain the caller's additional contextual information at block 1514. At block 1516, the service provider processes the caller's additional contextual information to obtain caller's conditions. The routine returns to decision block 1512 where the callee-contextual data processing routine 1500 repeats the above mentioned steps until the service provider does not need any more contextual information from the caller. If it is determined at decision block 1512 that additional caller's contextual information is not needed, the caller-contextual data processing routine 1500 proceeds to decision block 1518 to determine whether the caller's current conditions meet (satisfy) the callee's rules.

If it is determined that the rules are still satisfied, the service provider of the callee establishes the communication channel connection between the caller and the callee at block 1520. If it is determined that the rules are no longer satisfied, the service provider of the caller selects appropriate actions based on callee's contextual information and caller's contextual information at block 1522. For example, the service provider may select an action terminating initiation of the communication channel connection. In yet another example, the service provider may select an action notifying the callee and the caller of the disagreement between the callee's current conditions and the caller's rules. After establishing a connection (block 1520), or selecting appropriate actions (block 1522), the routine 1500 completes at block 1524.

Figure 16A:
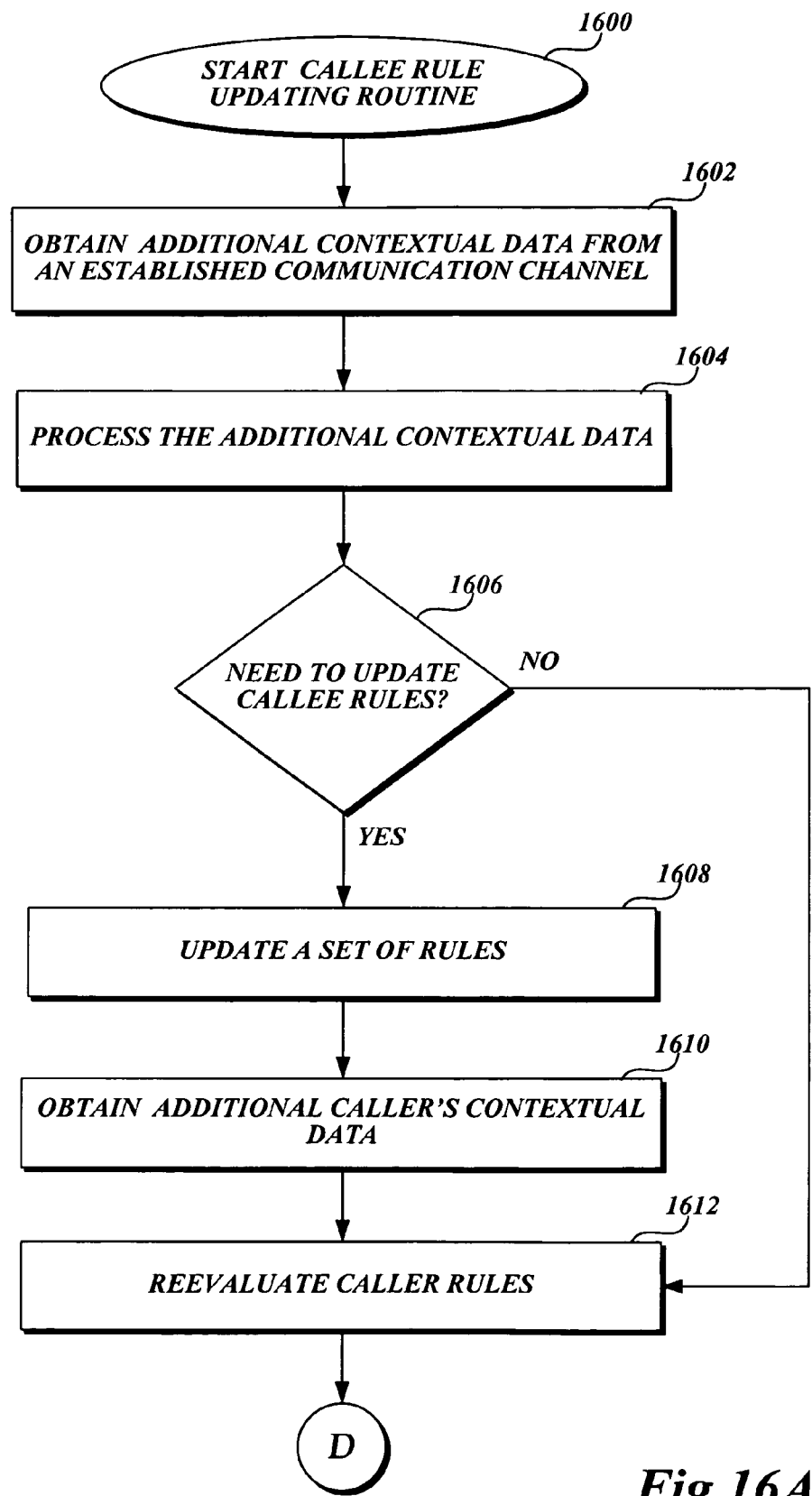
FIGS. 16A and 16B are flow diagrams illustrating a callee-rule updating routine in accordance with an aspect of the present invention.
Figure 16B:
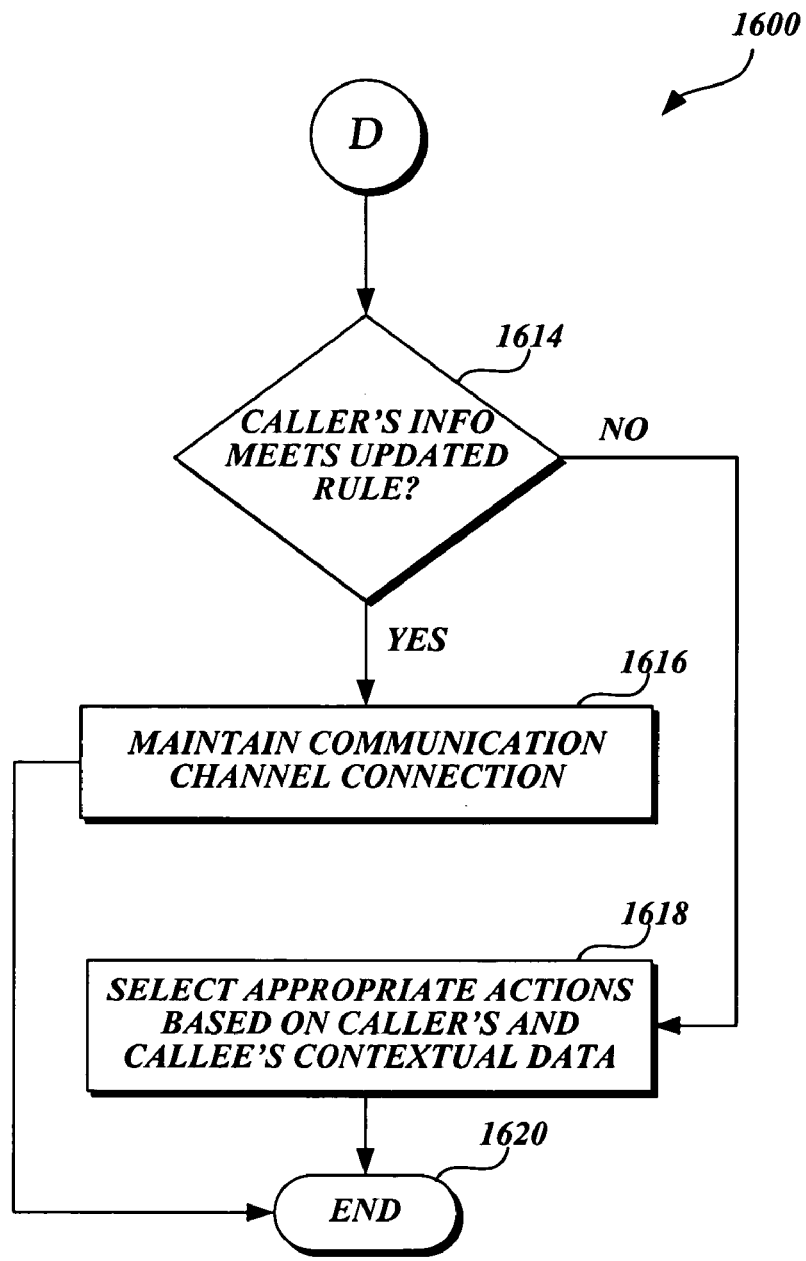

FIGS. 16A and 16B are flow diagrams illustrating a callee-rule updating routine 1600 for processing additional contextual information from the existing communication channel in accordance with an embodiment of the present invention. In an illustrative embodiment, a communication channel between devices of a caller and a callee has been established in accordance with the callee's rules and the caller's conditions determined during a connection set-up phase, as illustrated above in FIGS. 15A and 15B. During the communication, the caller's rules or the callee's conditions may change. In this embodiment, the callee's rules will be updated due to changes on the callee's side or needs of the callee. The updated callee's rules may be reevaluated to check whether the current caller's conditions still satisfy the updated callee's rules. The existing communication channel will be terminated if the current caller's conditions do not satisfy the updated callee rules. Similarly, the existing communication channel will be maintained if the current caller's conditions satisfy the updated callee's rules.

For example, when the existing call was established, the callee already had a set of rules specifying that any individual user would not communicate with customer A if customer A is in bad mood. When an individual user has an important conversation with customer A and during the conversation, customer A's mood changes from good to bad. If the set of callee's rules corresponding to customer A's mood is changed to allow the conversation with customer A even if customer A is in bad mood, the callee rules will be updated and the updated callee's rules will be reevaluated with the customer A's current conditions. As a result, the existing communication channel will be maintained. Otherwise, the customer A's current conditions do not satisfy the callee's rules and thus the existing communication channel will be terminated accordingly.

Beginning at block 1602, the service provider of the caller obtains additional contextual data from an established communication channel. At block 1604, the service provider of the callee may process the additional contextual data. As mentioned above, the additional contextual data may reflect changes in the callee or the caller. The routine 1600 proceeds to decision block 1606 to determine whether the callee rules should be updated due to the additional contextual information. If it is determined that callee rules needed updating, the service provider of the callee updates a set of rules from the callee rules in accordance with the processed additional information at block 1608. At block 1610, the service provider of the callee may obtain caller's contextual information which is needed in order to reevaluate the updated callee rules. At block 1612, the service provider of the callee reevaluates the updated callee rules with the caller's contextual information (e.g., caller's conditions). If it is determined at decision block 1606 that callee rules is not needed to be updated, the callee-rule updating routine 1600 proceeds to block 1612 where the service provider reevaluates the callee's rules with the caller's current conditions which have been determined from the caller's contextual information. The callee-rule updating routine 1600 proceeds to connecting terminal D. (See FIG. 16B)

With reference to FIG. 16B, starting from terminal D, the callee-rule updating routine 1600 continues to decision block 1614 to determine whether the caller's current information (e.g., caller's current conditions) meets the current callee's rules. If it is determined at decision block 1614 that the caller's current information satisfies the current callee's rules, the service provider of the callee maintains the existing communication channel connection as illustrated at block 1616. If it is determined at decision block 1614 that the caller's current information does not satisfy the current callee's rules, at block 1618, the service provider of the callee selects appropriate actions based on caller's contextual information and callee's contextual information. The service provider of the callee may select an action terminating the established channel connection. Subsequently, the service provider of the callee may send a message relating to the termination to the service provider of the caller. The caller may also be notified about a termination which occurs during the connection set-up phase. In yet another example, the service provider may select an action notifying the callee and the caller of the disagreement between the callee's current conditions and the caller's rules. It is contemplated that the disagreement can be resolved in various ways. It is further contemplated that VoIP clients, and/or service providers can dynamically negotiate to resolve the disagreements. In this example, the callee may be allowed to temporarily disable the callee's rule(s) corresponding to the termination so that the conversation can continues. Upon maintaining a connection (block 1616), or selecting appropriate actions (block 1618), the routine 1600 completes at block 1620.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for processing contextual information relating to an exchange of a conversation on a communication channel between a first client and a second client, comprising:
    establishing between the first client and the second client a predefined structured hierarchy to use to transmit contextual information; wherein the predefined structured hierarchy is used to transmit contextual information before and after the communication channel is established;

obtaining first contextual information relating to the first client; wherein the first contextual information is packetized and arranged according to the predefined structured hierarchy; wherein the contextual information comprises client preferences, a set of rules, and device functionality;

determining a set of rules by processing the obtained first contextual information;

obtaining second contextual information relating to the second client;

determining conditions of the second client by processing the second contextual information;

comparing the set of rules with the conditions of the second client;

if the conditions of the second client satisfy the set of rules, establishing, or maintaining a communication channel connection as indicated by the set of rules; and after establishing the communication channel as indicated by the set of rules performing operations comprising: obtaining additional contextual information; determining current conditions of the second client by processing the additional contextual information;

comparing the set of rules with the additional conditions of the second client; and providing a notification of terminating the communication channel when at least one rule of the set of rules does not satisfy a connection condition with the first client based on the condition of the second client, wherein the connection condition is at least one of a desired mood; a desired subject of the conversation; and a desired location.

2. The method of claim 1 further comprising:
upon receipt of additional contextual information relating to changes in the first client, dynamically updating the set of rules based on the additional contextual information.

3. The method of claim 2 further comprising:
upon receipt of additional contextual information relating to changes made in the second client, dynamically updating the conditions of the second client based on the additional second contextual information while the first client and the second client are communicating over the existing communication channel.

4. The method of claim 3 further comprising:
in response to the update in the set of rules and/or in the conditions of the second client, comparing the conditions of the second client with the set of rules.

5. The method of claim 4 further comprising:
terminating the communication channel if at least one rule of the set of rules indicates a connection termination based on the condition of the second client.

6. The method of claim 1, wherein the set of rules includes a rule indicating a desired location of the second client.

7. The method of claim 1, wherein the set of rules includes a rule indicating desired clients who can exchange a conversation over the communication channel.

8. The method of claim 1, wherein the set of rules includes a rule indicating a desired subject relating to the conversation.

9. The method of claim 1 further comprising:
selecting appropriate actions if the conditions of the second client disagree with the set of rules.

10. A memory having computer executable components for processing contextual information relating to a conversation on a communication channel between a first client and a second client comprising:

establishing between the first client and the second client a predefined structured hierarchy to use to transmit contextual information; wherein the predefined structured hierarchy is used to transmit contextual information before and after the communication channel is established;

obtaining first contextual information relating to the first client; wherein the first contextual information is packetized and arranged according to the predefined structured hierarchy; wherein the contextual information comprises client preferences, a set of rules, and device functionality;

determining a set of rules by processing the obtained first contextual information;

obtaining second contextual information relating to the second client;

determining conditions of the second client by processing the second contextual information;

comparing the set of rules with the conditions of the second client;

if the conditions of the second client satisfy the set of rules, establishing, or maintaining a communication channel connection as indicated by the set of rules; and after establishing the communication channel as indicated by the set of rules performing operations comprising: obtaining additional contextual information; determining current conditions of the second client by processing the additional contextual information;

comparing the set of rules with the additional conditions of the second client; and providing a notification of terminating the communication channel when at least one rule of the set of rules does not satisfy a connection condition with the first client based on the condition of the second client, wherein the connection condition is at least one of a desired mood; a desired subject of the conversation; and a desired location.

11. The memory of claim 10, further comprising rejecting a request to establish the communication channel based on the set of rules.

12. The memory of claim 11, wherein, upon receipt of additional contextual information relating to the set of rules, updating the set of rules by incorporating the additional contextual information.

13. The memory of claim 12, further comprising dynamically selecting appropriate actions on an existing communication channel connection in accordance with the updated set of rules.

14. The memory of claim 13, further comprising comparing a first client's condition and the set of rules before terminating the existing communication channel connection.

15. The memory of claim 14, further comprising comparing a second client's condition and the set of rules before terminating the existing communication channel connection.

16. A system for processing contextual information relating to an exchange of a conversation on a communication channel between a first client and a second client, comprising:
a processor and a memory storing instructions that when executed perform actions, comprising:
establishing between the first client and the second client a predefined structured hierarchy to use to transmit contextual information; wherein the predefined structured hierarchy is used to transmit contextual information before and after the communication channel is established;

obtaining first contextual information relating to the first client; wherein the first contextual information is packetized and arranged according to the predefined structured hierarchy; wherein the contextual information comprises client preferences, a set of rules, and device functionality;

determining a set of rules by processing the obtained first contextual information;

obtaining second contextual information relating to the second client;

determining conditions of the second client by processing the second contextual information;

comparing the set of rules with the conditions of the second client;

if the conditions of the second client satisfy the set of rules, establishing, or maintaining a communication channel connection as indicated by the set of rules; and after establishing the communication channel as indicated by the set of rules performing operations comprising: obtaining additional contextual information; determining current conditions of the second client by processing the additional contextual information;

comparing the set of rules with the additional conditions of the second client; and providing a notification of terminating the communication channel when at least one rule of the set of rules does not satisfy a connection condition with the first client based on the condition of the second client, wherein the connection condition is at least one of a desired mood; a desired subject of the conversation; and a desired location.

17. The system of claim 16 further comprising:
when the second client's conditions do not satisfy the set of rules, rejecting the request to establish the communication channel.

18. The system of claim 16, wherein a plurality of callers initiate a request to establish a communication channel with the second client.

19. The system of claim 16, wherein the rules include a set of rules relating to a group of allowed callers.

20. The system of claim 16 further comprising:
obtaining additional contextual information during the conversation; and terminating the existing communication channel if a changed condition does not satisfy the rules.

* * * * *